US011453320B1

United States Patent
Powell et al.

(10) Patent No.: US 11,453,320 B1
(45) Date of Patent: Sep. 27, 2022

(54) SEAT ASSEMBLY AND SEATBACK

(71) Applicant: Lear Corporation, Southfield, MI (US)

(72) Inventors: Michael R. Powell, Waterford, MI (US); Jeanette Puig-Pey, Bloomfield Hills, MI (US); Vyachislav Ivanov, West Bloomfield, MI (US); Louella Patterson, Goodells, MI (US); Anthony Mollica, Royal Oak, MI (US); Brad Duncan, Harrison Twp, MI (US); Wee Gam, Troy, MI (US); Karl W. Henn, New Hudson, MI (US); Paul Severinski, Brownstown, MI (US); Mark Weaver, Auburn Hills, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 17/219,072

(22) Filed: Mar. 31, 2021

(51) Int. Cl.
*B60N 2/60* (2006.01)
*B60N 2/72* (2006.01)
*B60N 2/56* (2006.01)

(52) U.S. Cl.
CPC ......... *B60N 2/5671* (2013.01); *B60N 2/5657* (2013.01); *B60N 2/5685* (2013.01); *B60N 2/5692* (2013.01)

(58) Field of Classification Search
CPC .. B60N 2/5657; B60N 2/5671; B60N 2/5685; B60N 2/5692; B60N 2/56; B60N 2/5628; B60N 2/5642
See application file for complete search history.

(56) References Cited

U.S. PATENT DOCUMENTS

| | | | |
|---|---|---|---|
| 6,994,401 B1 | 2/2006 | Fischer et al. | |
| 8,727,434 B2* | 5/2014 | Sahashi | B60N 2/66 297/180.13 |
| 9,096,157 B2 | 8/2015 | Line et al. | |
| 9,713,975 B2 | 7/2017 | Berry et al. | |
| 10,343,565 B2 | 7/2019 | Baek et al. | |
| 10,449,877 B1* | 10/2019 | Tait | B60N 2/565 |
| 10,471,864 B1* | 11/2019 | Tait | B60N 2/565 |
| 2007/0040421 A1* | 2/2007 | Zuzga | B60N 2/5657 297/180.13 |
| 2007/0069554 A1* | 3/2007 | Comiskey | B60N 2/5692 432/27 |
| 2009/0008970 A1 | 1/2009 | Flory et al. | |
| 2009/0033130 A1* | 2/2009 | Marquette | B60N 2/5685 297/180.15 |
| 2012/0256450 A1* | 10/2012 | Sahashi | B60N 2/5635 297/180.14 |
| 2016/0304013 A1* | 10/2016 | Wolas | B60N 2/5657 |
| 2021/0339661 A1* | 11/2021 | Pacilli | B60N 2/5642 |

FOREIGN PATENT DOCUMENTS

DE 10059358 B4 12/2005
FR 3084027 A1 1/2020

* cited by examiner

*Primary Examiner* — Shin H Kim
(74) *Attorney, Agent, or Firm* — Fishman Stewart PLLC

(57) ABSTRACT

A seat assembly may include a seatback frame, a primary carrier, an airflow duct, and a plurality of airflow outlets. The primary carrier may be connected to the seatback frame. The airflow duct may be defined at least partially by the primary carrier. The plurality of airflow outlets may extend through the primary carrier to an external surface and may be in fluid communication with the airflow duct.

20 Claims, 17 Drawing Sheets

SEAT ASSEMBLY AND SEATBACK

TECHNICAL FIELD

The present disclosure generally relates to a seat assembly having a seatback, including a modular/segmented seat assembly that may, for example, be used in connection with a vehicle.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Some seat assembly designs, including designs for sport and/or racing-inspired seats, may be relatively complex, may include several different portions which may be difficult to assemble, may not be adjustable, and/or may lack some of the comfort features found in modern luxury seats.

There is a desire for solutions/options that minimize or eliminate one or more challenges or shortcomings of seat assemblies and/or components or portions thereof. The foregoing discussion is intended only to illustrate examples of the present field and is not a disavowal of scope.

SUMMARY

In embodiments, a seat assembly may include a seatback frame, a primary carrier, an airflow duct. The primary carrier may include a plurality of airflow outlets. The primary carrier may be connected to the seatback frame. The airflow duct may be defined at least partially by the primary carrier. The plurality of airflow outlets may extend through the primary carrier to an external surface and/or may be in fluid communication with the airflow duct.

With embodiments, a seat assembly may include a seatback frame, a primary carrier, a headrest, an airflow duct, a duct cover, a plurality of airflow outlets, a plurality of air movers, a plurality of thermoelectric devices (TEDs), an intermediate layer, and/or a headrest outlet. The primary carrier may be connected to the seatback frame. The headrest may be connected to the primary carrier. The airflow duct may be defined at least partially by the primary carrier. The duct cover may be connected to the primary carrier to substantially close the airflow duct. The plurality of airflow outlets may extend through the primary carrier to an external surface and/or may be in fluid communication with the airflow duct. A first air mover may be configured to provide a first airflow to the airflow outlets. The first air mover may be in fluid communication with the airflow duct and may be connected to the primary carrier. A first thermoelectric device (TED) may be connected to the primary carrier and may be configured to heat and/or cool the first airflow. The intermediate layer may be connected to the primary carrier. The intermediate layer may include a heater and/or may be configured to convey a second airflow. A second air mover may be configured to provide the second airflow. The second air mover may be in fluid communication with the intermediate layer and may be connected to the primary carrier. A second TED may be connected to the primary carrier and may be configured to heat and/or cool the second airflow. A third air mover may be connected to the primary carrier and may be configured to provide a third airflow to the headrest. A third TED may be disposed within the headrest and may be configured to heat and/or cool the third airflow. The headrest outlet may be disposed in the headrest and may be configured to convey the third airflow out of the headrest.

The foregoing and other potential aspects, features, details, utilities, and/or advantages of examples/embodiments of the present disclosure will be apparent from reading the following description, and from reviewing the accompanying drawings.

BRIEF DESCRIPTION OF THE DRAWINGS

While the claims are not limited to a specific illustration, an appreciation of various aspects may be gained through a discussion of various examples. The drawings are not necessarily to scale, and certain features may be exaggerated or hidden to better illustrate and explain an innovative aspect of an example. Further, the exemplary illustrations described herein are not exhaustive or otherwise limiting, and are not restricted to the precise form and configuration shown in the drawings or disclosed in the following detailed description. Exemplary illustrations are described in detail by referring to the drawings as follows:

DETAILED DESCRIPTION

Reference will now be made in detail to embodiments of the present disclosure, examples of which are described herein and illustrated in the accompanying drawings. While the present disclosure will be described in conjunction with embodiments and/or examples, they do not limit the present disclosure to these embodiments and/or examples. On the contrary, the present disclosure covers alternatives, modifications, and equivalents.

Figure 1A:
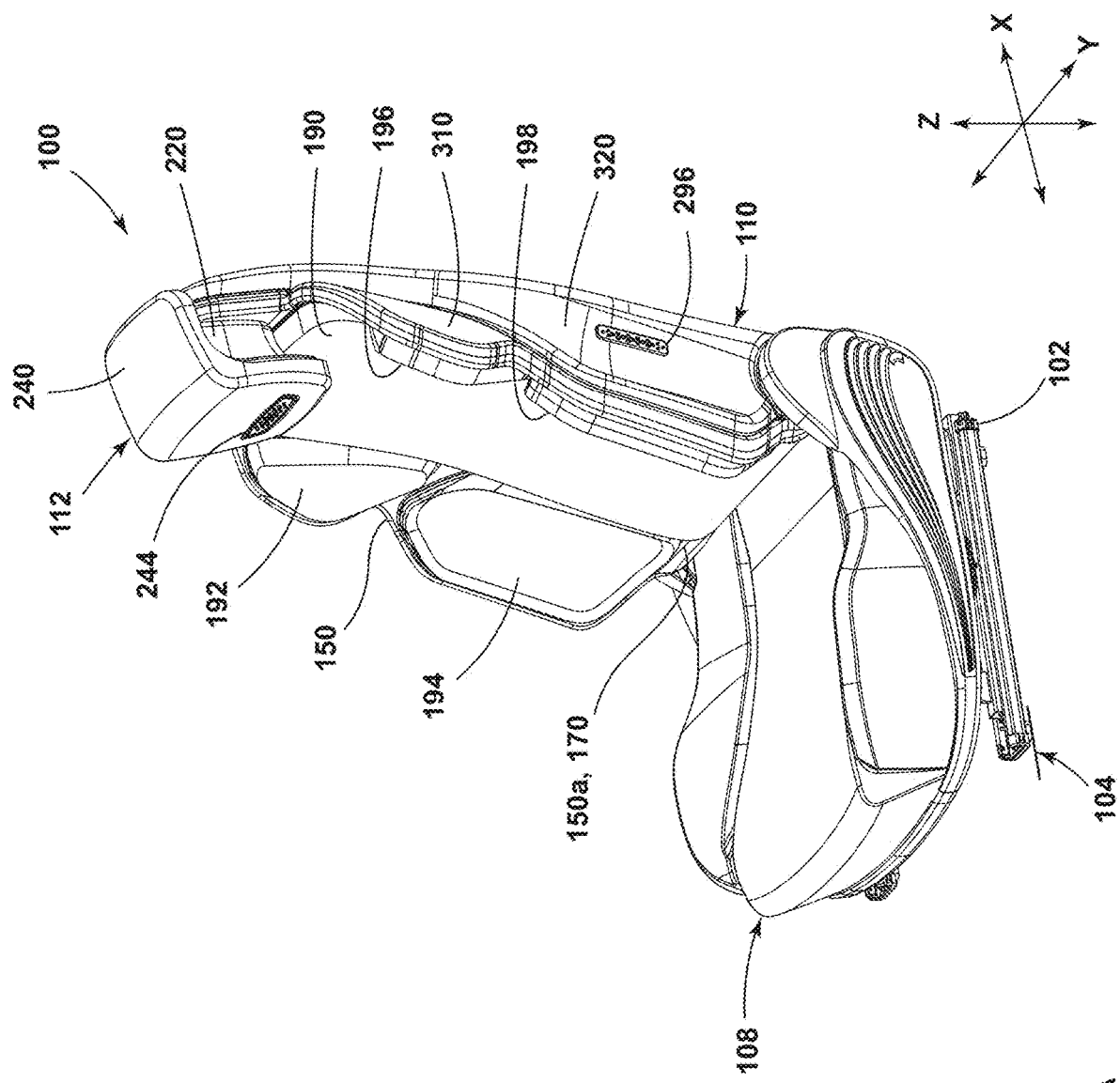
FIGS. 1A and 1B are perspective views of an embodiment of a seat assembly according to teachings of the present disclosure.
Figure 1B:
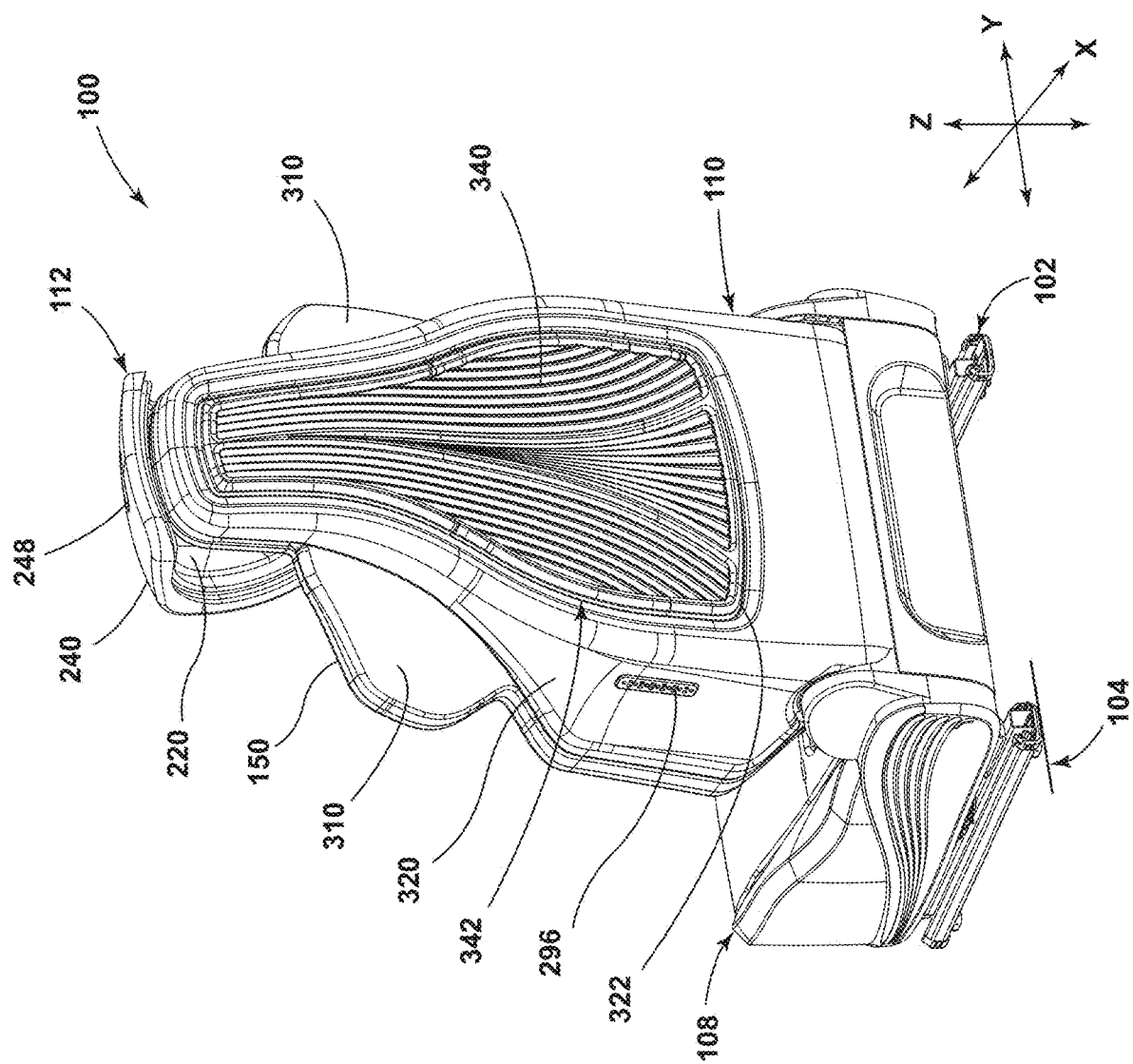

In embodiments, such as illustrated in FIGS. 1A and 1B, a seat assembly 100 may be configured as a modular/segmented seat assembly that may include a plurality of components, elements, parts, etc., such as for a passenger vehicle. The seat assembly 100 may form an individual seat and/or a portion of some other seating system, mechanism, device, or assembly such as a front seat assembly, rear seat assembly, an intermediate row seat assembly, and/or other seat apparatus. A seat assembly 100 may, for example and without limitation, be used in conjunction with a passenger vehicle (e.g., cars, vans, SUVs, trucks, buses, trains, boats, ships, planes, etc.), and may be utilized in any other situation or apparatus where seating is desired, such as homes, office buildings, warehouse facilities, theaters, stadiums, recreational vehicles, commercial vehicles/equipment, agricultural vehicles/equipment, and/or roller coasters, among others.

In embodiments, such as generally illustrated in FIGS. 1A and 1B, a seat assembly 100 may be selectively connected (e.g., electrically and/or mechanically) to a track/rail assembly 102 and/or disposed on a mounting surface 104 (e.g., a vehicle floor) of a vehicle. An electronic control unit (ECU) 106 may be connected to a seat assembly 100 (see, e.g., FIGS. 10 and 12). Additionally and/or alternatively, an ECU 106 may be connected to another portion (e.g., of a vehicle) and may be electrically connected to seat assembly 100, such as via a track assembly 102 and/or wirelessly. An ECU 106 may be configured to at least partially control operation of a seat assembly 100.

With embodiments, such as generally illustrated in FIGS. 1A and 1B, a seat assembly 100 may include a plurality of seat portions and/or a plurality of seat components. For example, the seat assembly 100 may include a seat bottom 108 on which a user may sit, a seatback 110 against which a user may lean, such as when sitting on the seat bottom 108, and/or a headrest 112. In some examples, a headrest 112 may be connected to the seatback 110 such that the position of the headrest 112 relative to the seatback 110 is not adjustable (e.g., fixed on the seatback 110 and/or a seatback frame 146) and/or is formed as a portion/section of the seatback 110.

Figure 2:
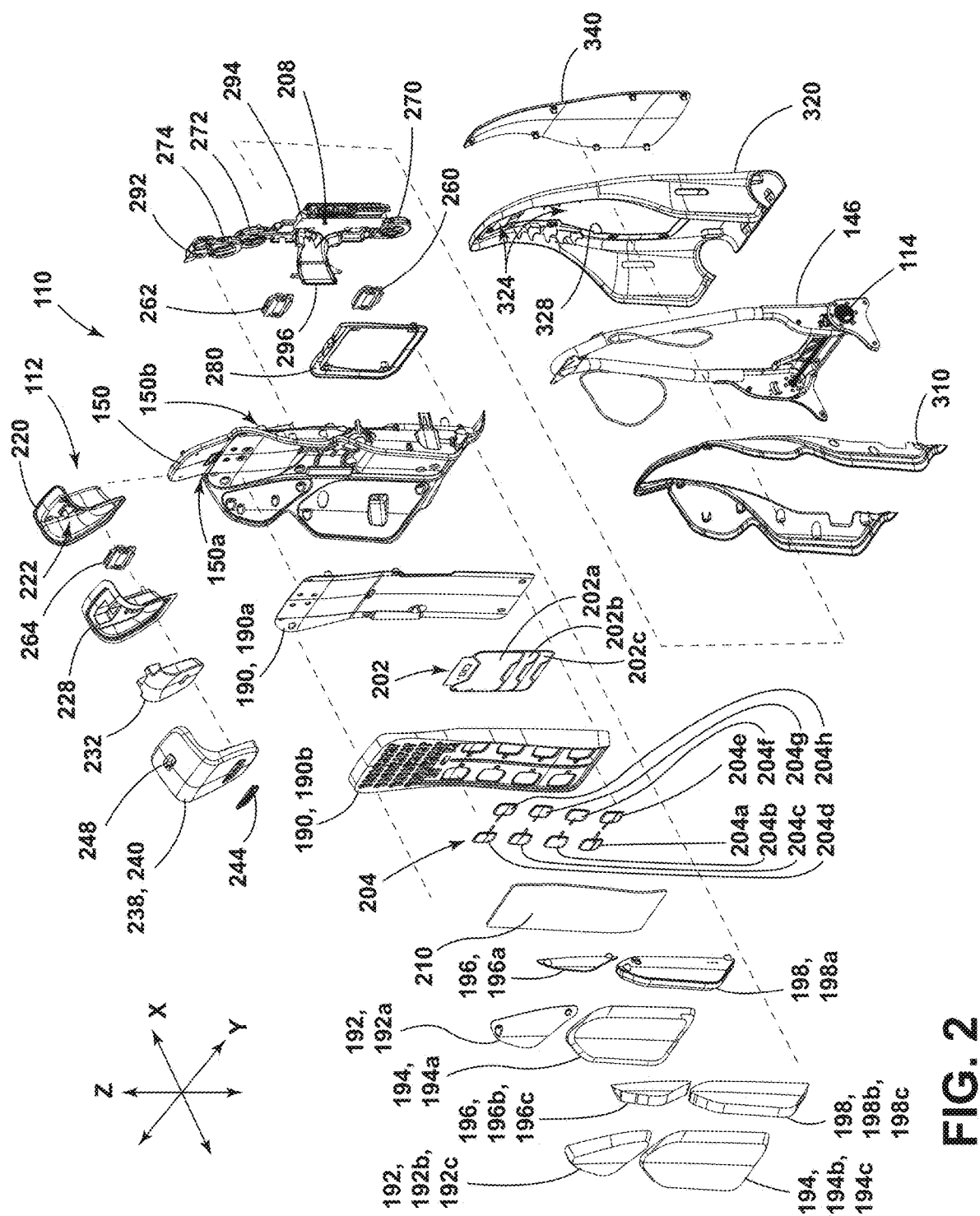
FIG. 2 is an exploded perspective view generally illustrating portions of an embodiment of a seatback according to teachings of the present disclosure.
Figure 10:
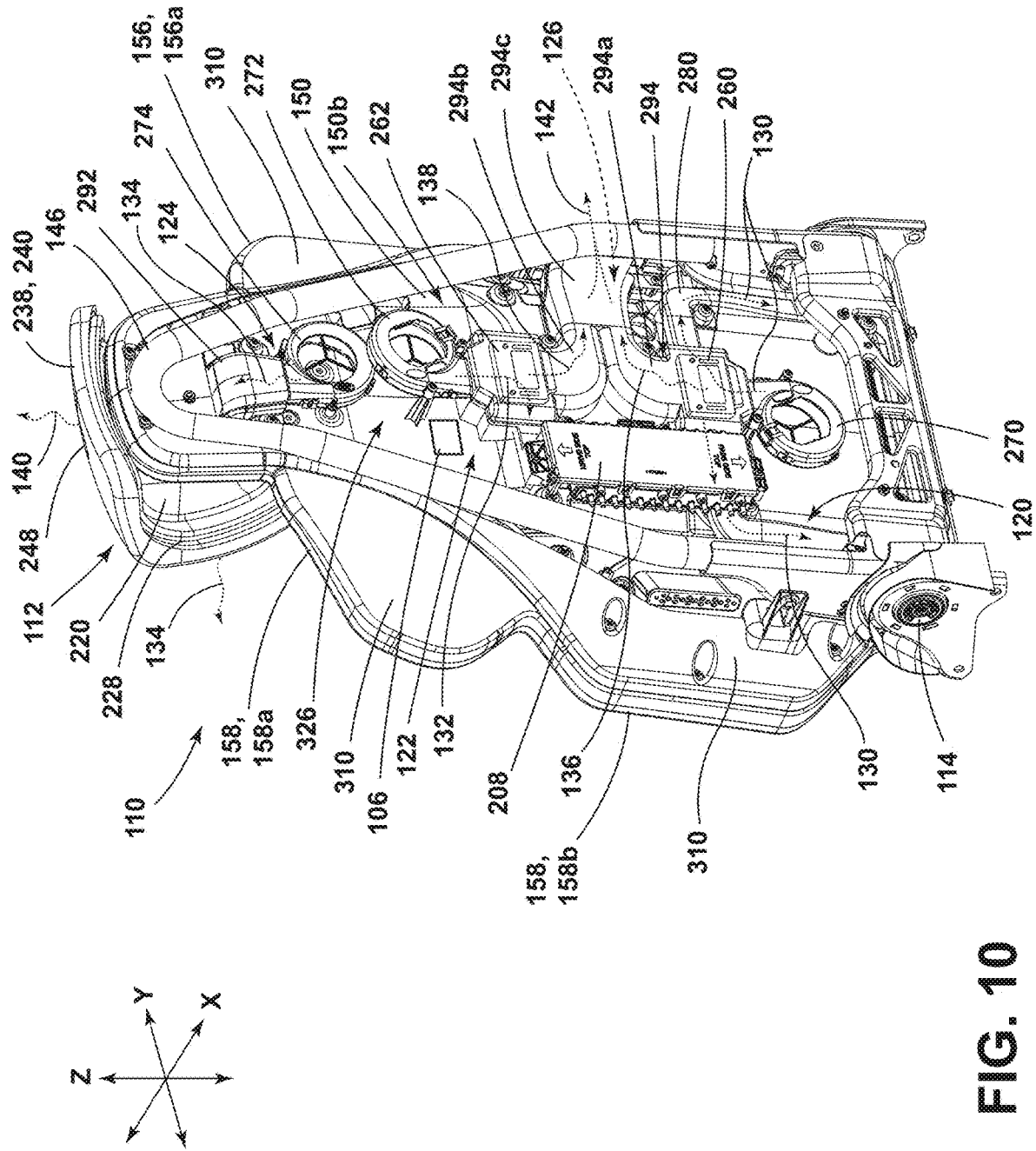
FIG. 10 is a rear perspective view generally illustrating portions of an embodiment of a seatback according to teachings of the present disclosure.

With embodiments, such as generally illustrated in FIGS. 2 and 10, a seat assembly 100 may include a seat actuator 114. A seat actuator 114 may be configured to adjust a seat assembly 100, a seat bottom 108, and/or a seatback 110, such as relative to one another and/or another portion of a vehicle (e.g., a mounting surface 104) for example. A seat actuator 114 may be configured to adjust a position of a seat assembly 100 on a track assembly 102, rotate a seat assembly 100, tilt a seat bottom 108 and/or a seatback 110, and/or provide one or more adjustments to other portions of a seat assembly 100. A seat actuator 114 may be configured to change (e.g., adjust) an angle between a seat bottom 108 and a seatback 110. A seat actuator 114 may be automatically controlled by an ECU 106 and/or may be manually controlled by a user, such as via a user interface. A user interface may, for example, be disposed on, in, and/or proximate a seat assembly 100 (e.g., a seat bottom 108). A user interface may, for example, receive commands via one or more inputs from a user (e.g., audio input, motion input, physical input, etc.). An ECU 106 may be configured to control a seat actuator 114 according to input from a user that may be provided via a user interface. A seat actuator 114 may, for example and without limitation include an electric motor.

In embodiments, such as generally illustrated in FIGS. 1A and 1B, a seat bottom 108 may be disposed adjacent to and/or may be connected to a lower region of the seatback 110. A seat bottom 108 may be configured as a modular/segmented seat bottom 108 that may include a plurality of components, elements, parts, etc. which, when assembled, may form the seat bottom 108. A seat bottom 108 may extend in a similar direction to a mounting surface 104 (e.g., in a direction substantially transverse to gravitational force). The firmness, position, and/or orientation of a seat bottom 108 relative to a seatback 110 or a mounting surface 104 may be adjustable via a seat actuator 114, which may allow a user to customize the configuration of the seat bottom 108. In some examples, a seat bottom 108 may include one or more seat bottom bolsters which protrude therefrom (e.g., at an oblique angle), such as to guide a user to sit in a central region of the seat bottom 108 and/or to bias the user toward a designed seating position. A seat bottom 108 may be constructed or composed of one or more of a variety of materials, such as fabric, foam, metal, plastic, injection foam-in-place materials, and/or others. A seat bottom 108 may be any desired size and shape, and may be constructed from or composed of any desired material.

With embodiments, such as generally illustrated in FIGS. 1A-12, a seatback 110 may be configured as a modular/segmented seatback 110 that may include a plurality of components, elements, parts, assemblies, etc. which, when assembled, may form the seatback 110. These components may be constructed or composed of a variety of materials such as fabric, foam, metal, plastic, injection foam-in-place materials, and/or other materials. The firmness, position, and/or orientation of a seatback 110 relative to a seat bottom 108 or a mounting surface 104 may be adjustable via a seat actuator 114, which may allow a user to customize the configuration of the seatback 110. A seatback 110 may be include one or more of a variety of sizes and shapes, and may be constructed from or composed of one or more of a variety of materials.

Figure 5:
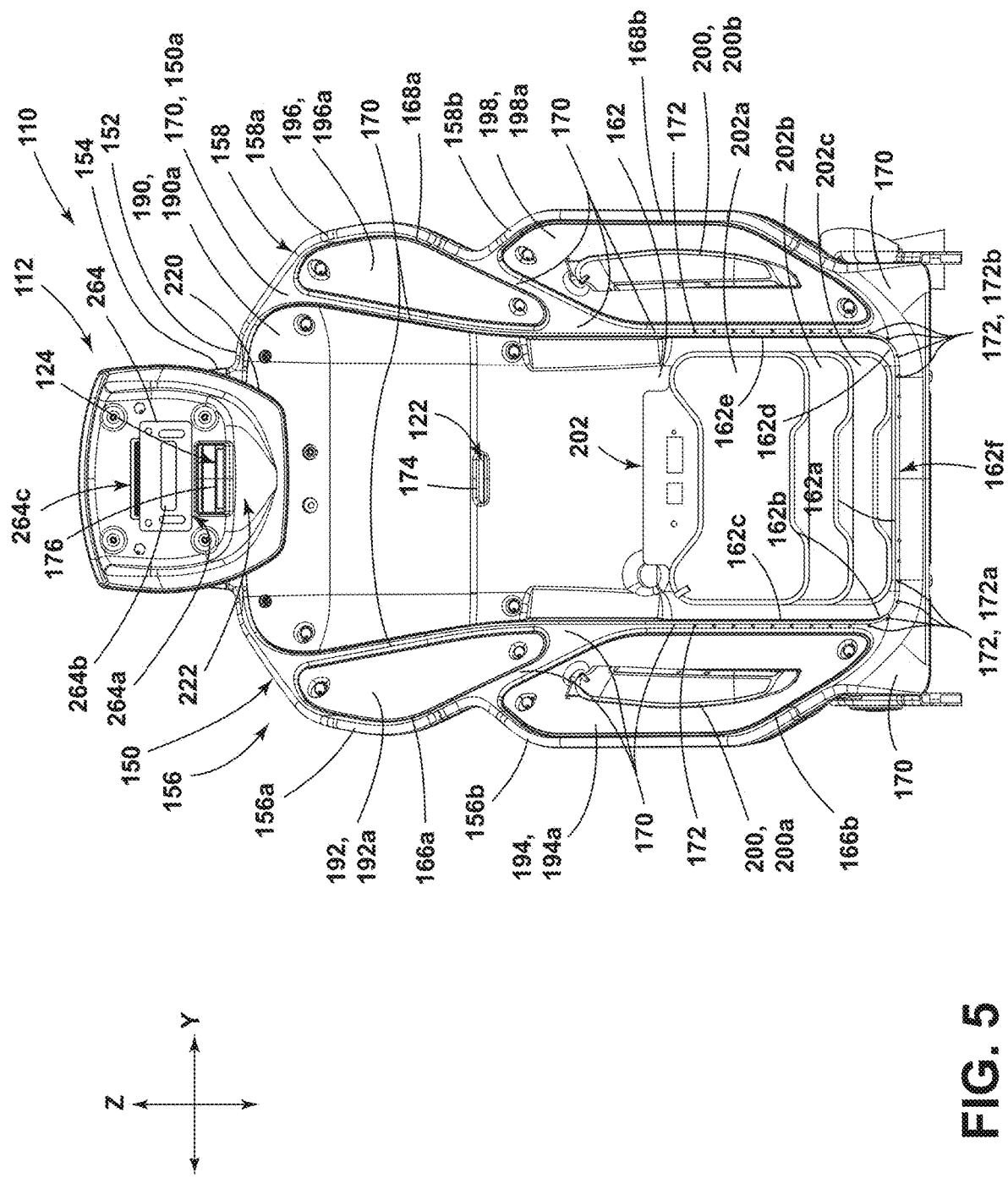
FIGS. 5-7 are front views generally illustrating portions of an embodiment of a seatback according to teachings of the present disclosure.

With embodiments, such as generally shown in FIG. 2, a seatback 110 may include one or more components such as a seatback frame 146, a primary carrier 150, one or more cushion assemblies 190-198, one or more cushion supports 190a-198a, one or more cushions 190b-198b, one or more trim portions 190c-198c, one or more thermoelectric devices (TEDs) 260-264, one or more air movers 270-274, one or more duct covers 280, 292, 294, one or more seatback exhaust outlets 296, a primary back panel 320, a secondary back panel 310, and/or a floating back panel 340. In some examples, a seatback 110 may include a headrest 112, and/or a headrest 112 may be a component of a seatback 110. A headrest 112, which may be configured as a subassembly, may include one or more portions and/or components, such as a headrest carrier 220, one or more headrest support portions 228, 232, a TED 264, one or more headrest cushions 238, and/or a headrest trim cover 240. One or more of the aforementioned components may be connected together, such as generally illustrated in FIGS. 1A, 1B, and 5, for example, to form the seatback 110 and/or to form a subassembly to which other components may be connected to form the seatback 110.

Figure 9:
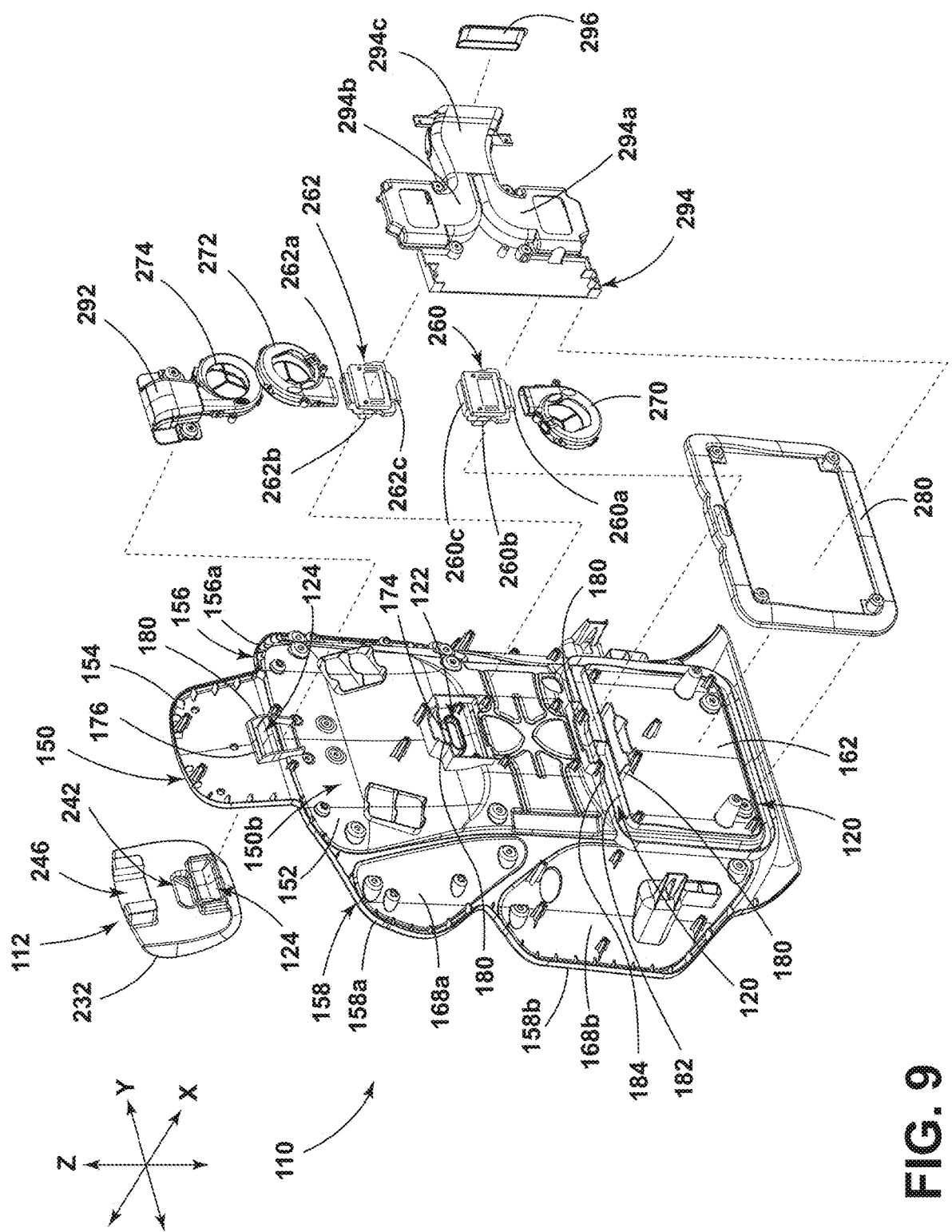
FIG. 9 is an exploded perspective view generally illustrating portions of an embodiment of a seatback according to teachings of the present disclosure.

With embodiments, such as generally illustrated in FIG. 9, a seatback 110 may include one or more fluid ducts. For example and without limitation, a seatback 110 may include a first airflow duct 120, a second airflow duct 122, a third airflow duct 124, and/or one or more exhaust ducts (e.g., a common exhaust duct 126). Additionally and/or alternatively, a seatback 110 and/or a headrest 112 may include a headrest airflow duct 242 and/or a headrest exhaust duct 246.

Figure 11:
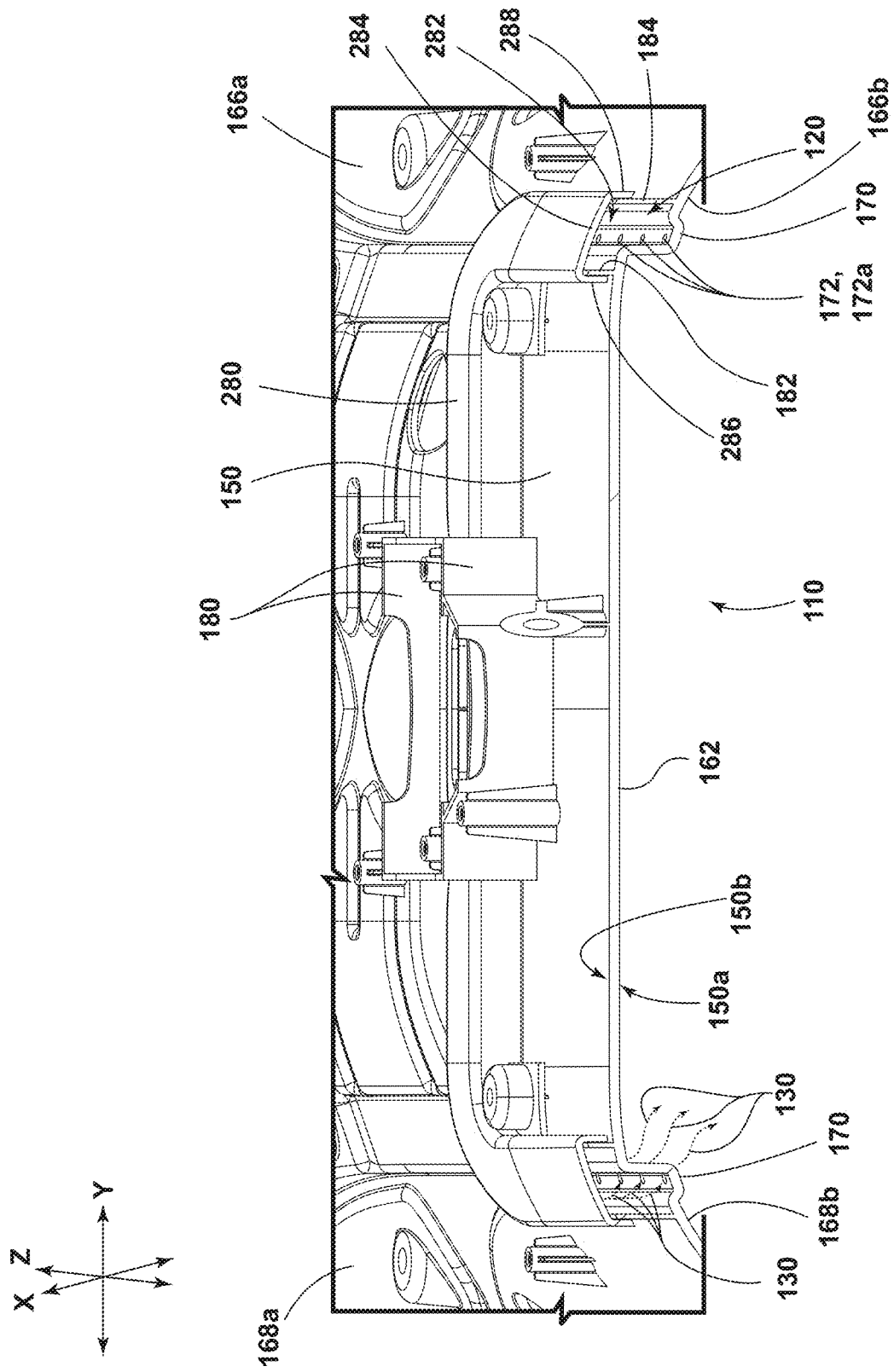
FIG. 11 is a cross-sectional view of an embodiment of a primary carrier, a first duct cover, and a first airflow duct according to teachings of the present disclosure.

With embodiments, such as generally depicted in FIGS. 9 and 11, a first airflow duct/passage 120 may be at least partially defined by and/or extend through a primary carrier 150 (e.g., a rear side 150b of a primary carrier 150), a first duct cover 280, a first TED 260, and/or a first air mover 270.

Figure 3A:
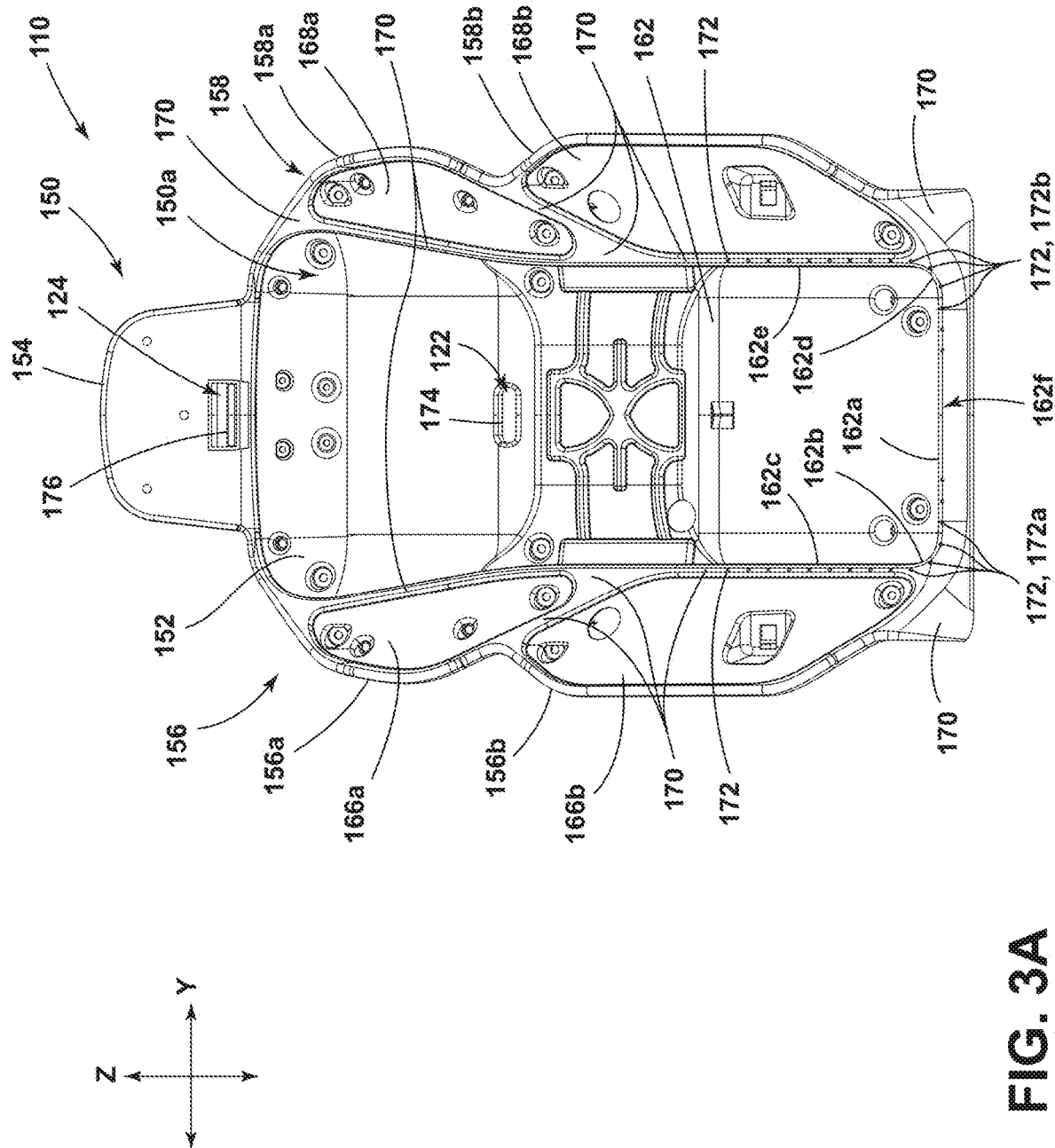
FIGS. 3A and 3B are front views of an embodiment of a primary carrier according to teachings of the present disclosure.
Figure 3B:
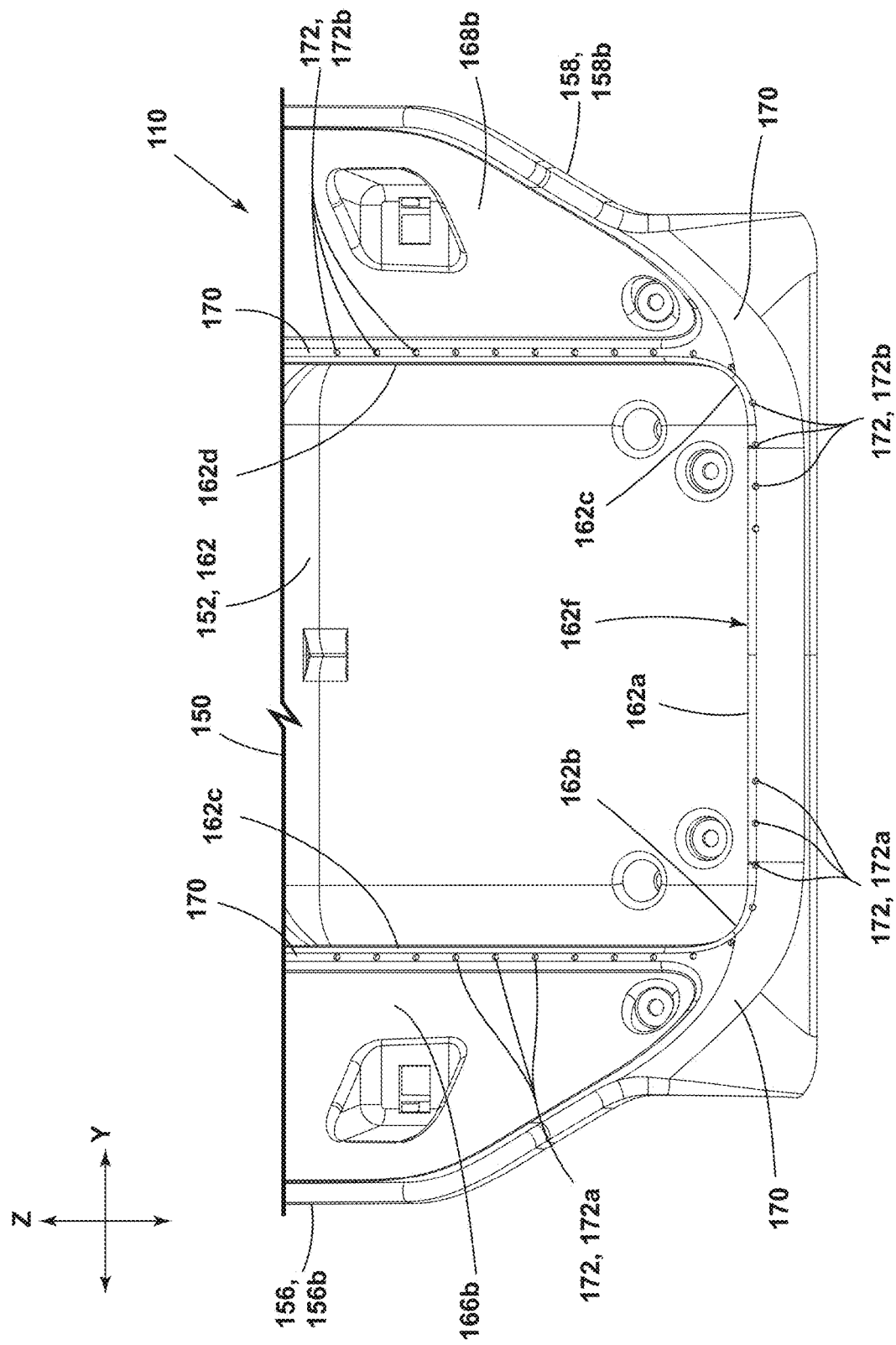
Figure 3C:
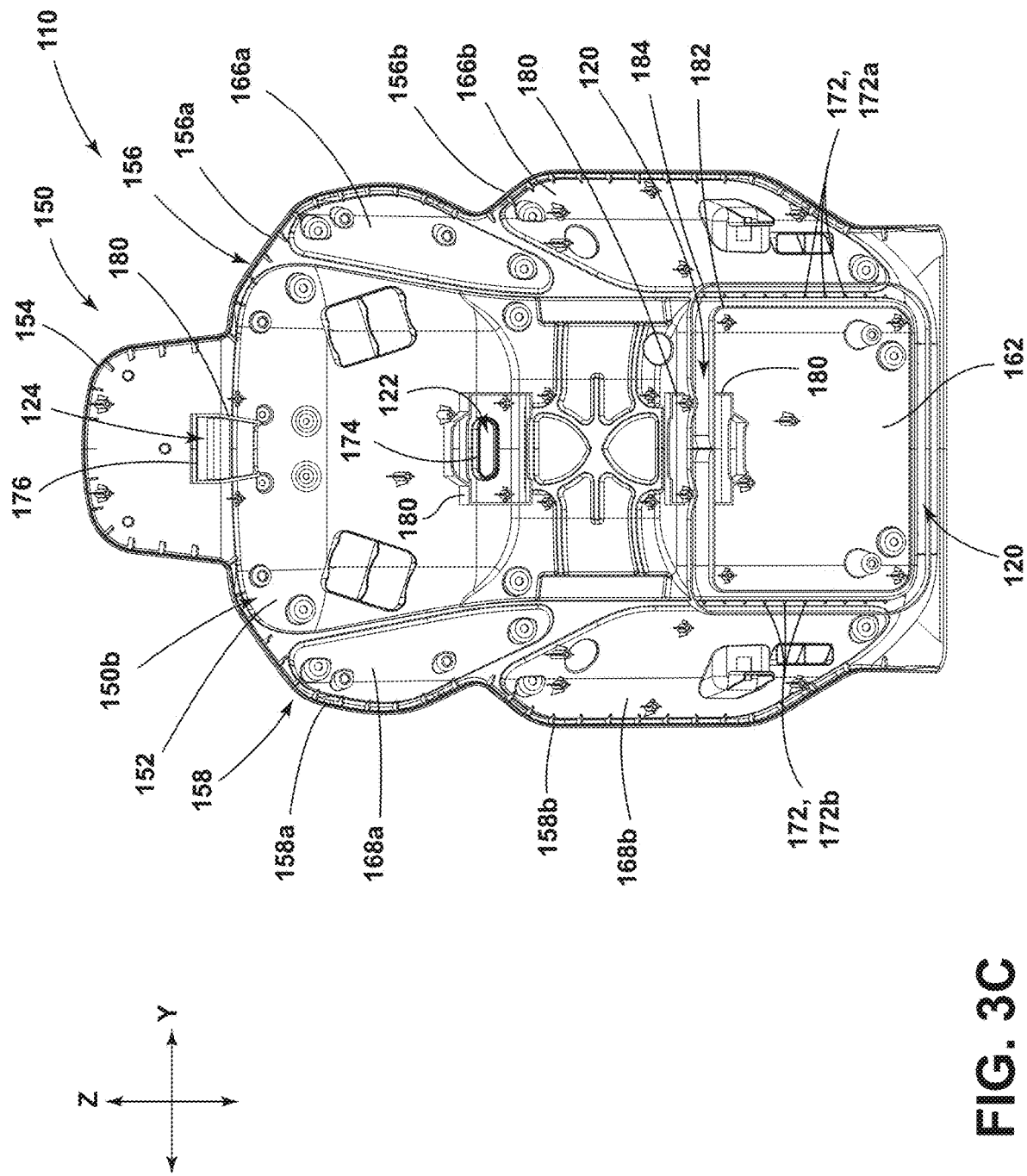
FIGS. 3C and 3D are rear views of an embodiment of a primary carrier according to teachings of the present disclosure.
Figure 3D:
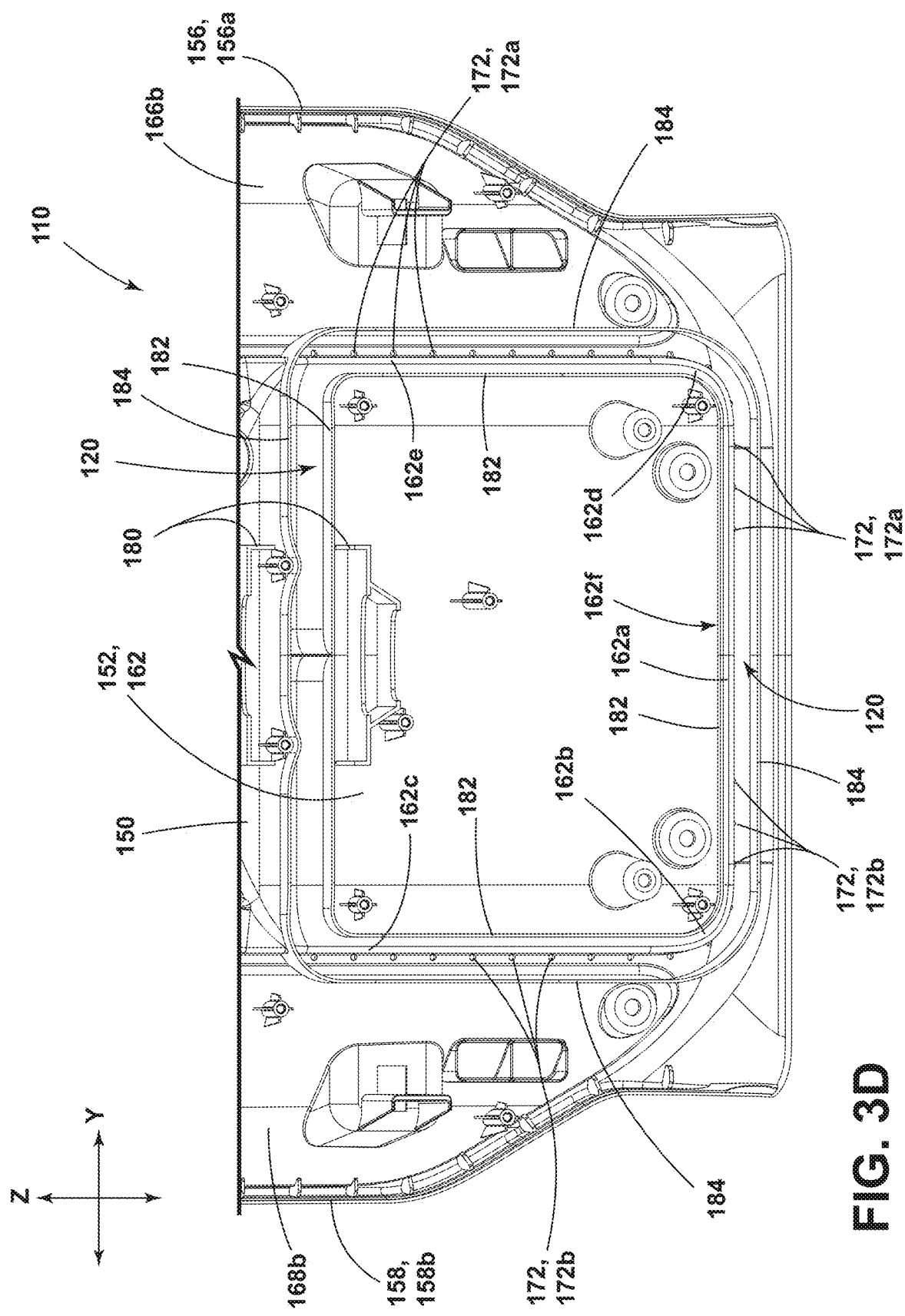

A first airflow duct 120 may be in fluid communication with a first TED 260, a first air mover 270, and/or one or more first airflow outlets 172 (see, e.g., FIGS. 3D and 11). A first airflow duct 120 may be configured to receive a first airflow 130 from a first air mover 270 and/or a first TED 260 and conduct the first airflow 130 to one or more first airflow outlets 172.

With embodiments, such as generally depicted in FIGS. 3A, 3C-6, and 9, a second airflow duct/passage 122 may be at least partially defined by and/or extend through a primary carrier 150 (e.g., a rear side 150b of a primary carrier 150), a second airflow opening 174, a second TED 262, a second air mover 272, and/or one or more cushion assemblies 190-198. A second airflow duct 122 may be in fluid communication with a second TED 262, a second air mover 272, a second airflow opening 174, one or more cushion assemblies 190-198 (e.g., a main cushion assembly 190), and/or an intermediate layer 210. A second airflow duct 122 may be configured to receive a second airflow 132 from a second air mover 272 and/or a second TED 262 and conduct the second airflow 132 through a primary carrier 150 and/or one or cushion assemblies 190-198 (e.g., a main cushion assembly 190) to an intermediate layer 210.

With embodiments, such as generally depicted in FIGS. 3A, 3C-5, and 9, a third airflow duct/passage 124 may be at least partially defined by and/or extend through a primary carrier 150 (e.g., a rear side 150b of a primary carrier 150), a third airflow opening 176, a third TED 264, a third air mover 274, one or more portions of a headrest 112, and/or a second duct cover 292. A third airflow duct 124 may be in fluid communication with a third TED 264, a third air mover 274, and/or a third airflow opening 176. A third airflow duct 124 may be configured to receive a third airflow 134 from a third air mover 274 and conduct the third airflow 134 through a primary carrier 150 and/or one or portions of a headrest 112 to a third TED 264.

Figure 12:
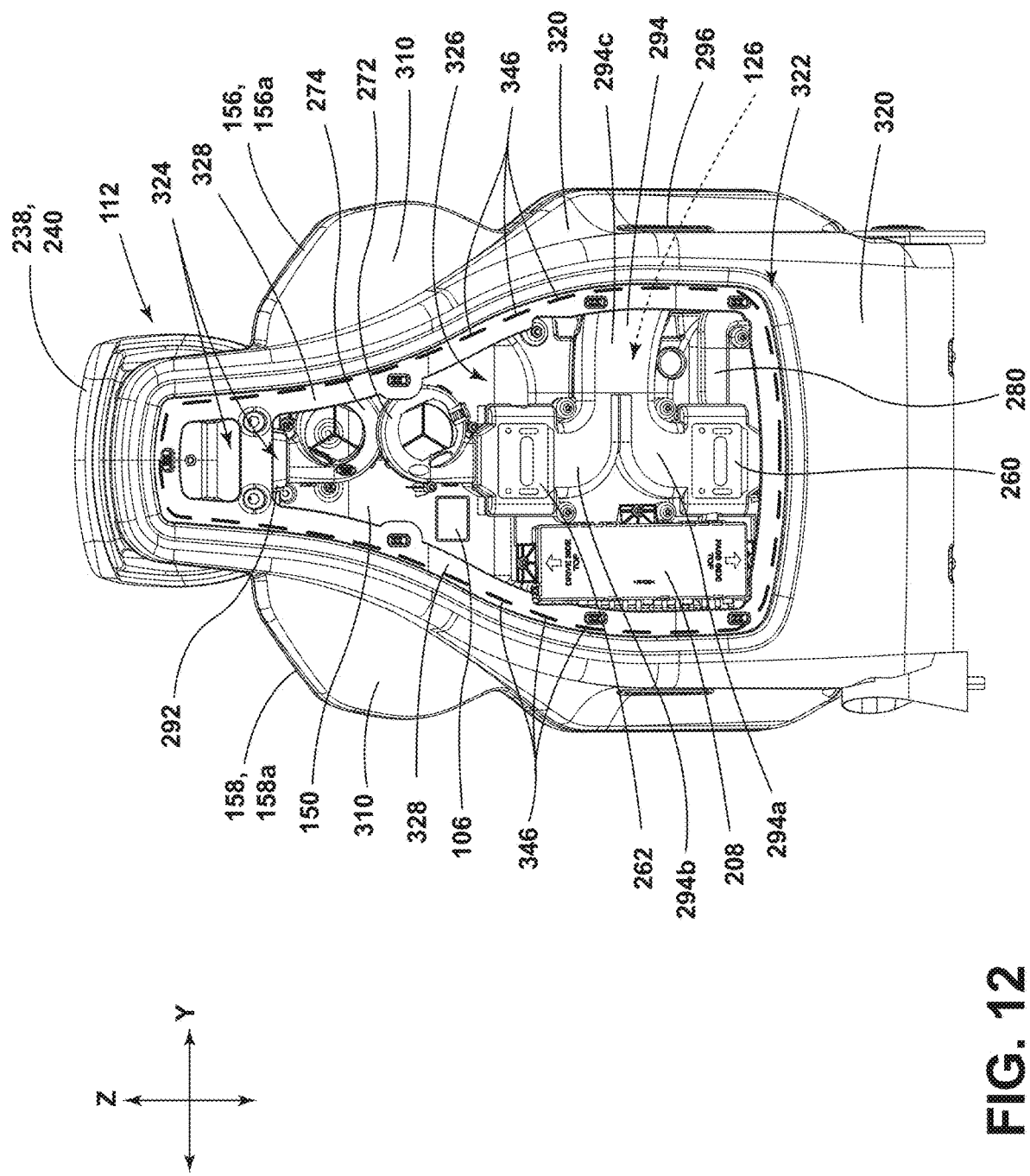
FIGS. 12 and 13 are rear views generally illustrating portions of an embodiment of a seatback according to teachings of the present disclosure.
Figure 13:
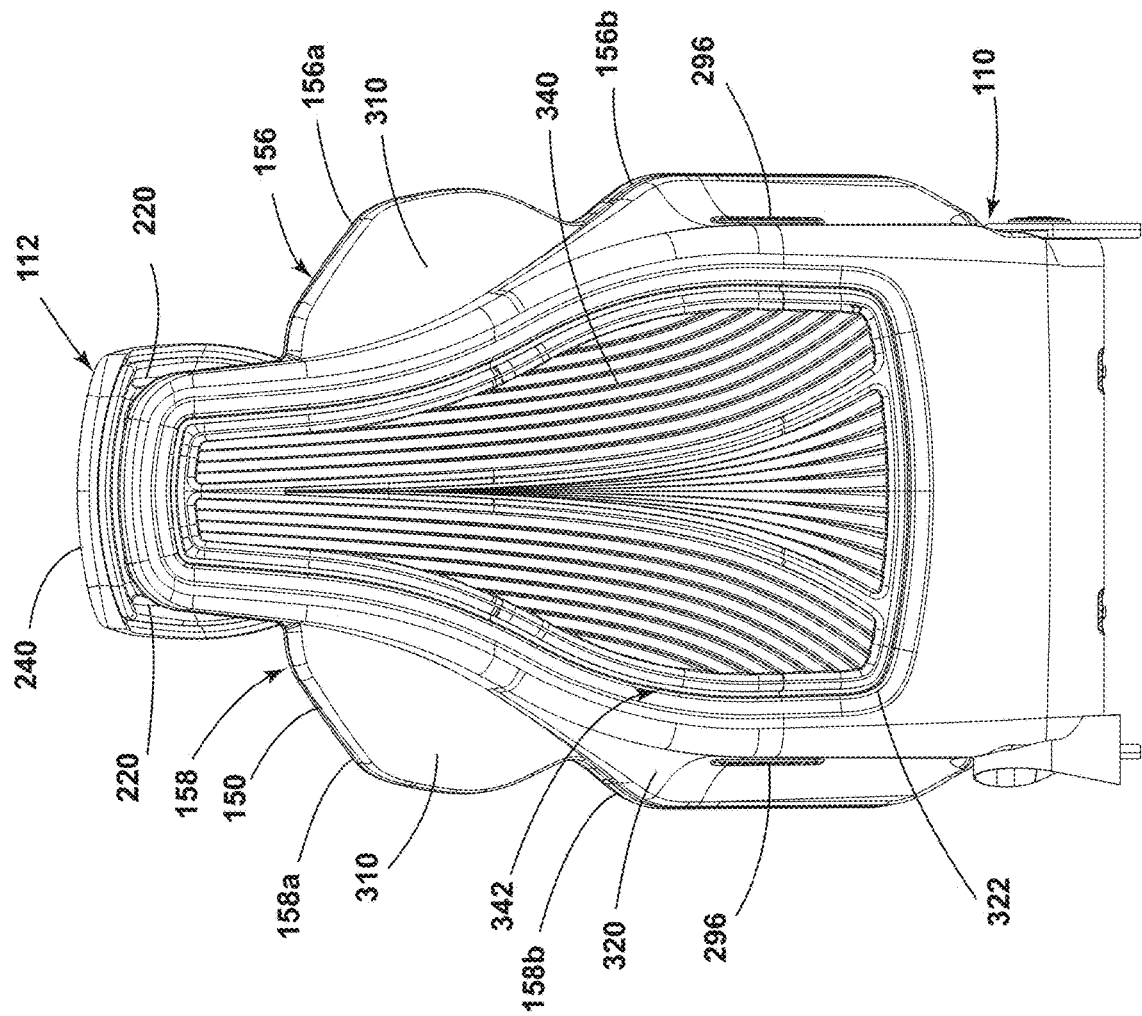

With embodiments, such as generally depicted in FIGS. 10 and 12, an exhaust duct 126 may be at least partially defined by a primary carrier 150 and/or an exhaust duct cover 294. An exhaust duct 126 may be in fluid communication with a TED 260, 262 and/or a seatback exhaust outlet 296. An exhaust duct 126 may be configured to receive an exhaust airflow 136, 138 from a TED 260, 262 and conduct the exhaust airflow 136, 138 to a seatback exhaust outlet 296. In some examples, an exhaust duct 126 may be configured as a common exhaust duct, which may be in fluid communication with two or more TEDs (e.g., a first TED 260 and a second TED 262). During operation, a common exhaust duct 126 may receive a first exhaust airflow 136 from a first TED 260 and/or a second exhaust airflow 138 from a second TED 262. The exhaust airflows 136, 138 may merge within the common exhaust duct 126 to form a merged exhaust airflow 142, which be conducted via the common exhaust duct 126 to an exterior of the seatback 110, such as via one or more seatback exhaust outlets 296.

With examples, such as generally illustrated in FIGS. 2 and 10, a seatback frame 146 may provide a support structure to which other seat components or portions may be connected and/or assembled. A seatback frame 146 may be composed of one or more of a variety of materials (e.g., metal and/or plastic) and may include a plurality of connectors (e.g., flanges, recesses 324, bosses, etc.) to facilitate connection of other seat components or portions (e.g., a primary carrier 150, a primary back panel 320, etc.) to the seatback frame 146. A lower end of a seatback frame 146 may be connected to, for example, a seat bottom 108, a track assembly 102, a seat actuator 114, a mounting surface 104, and/or to a portion of a vehicle.

With embodiments, such as generally depicted in FIGS. 2 and 9, a primary carrier 150 may be configured as a cover, housing, and/or structure forming at least a portion (e.g., a front side 150a) of a seatback 110. A primary carrier 150 may include one or more of a variety of shapes, sizes, and/or materials (e.g., a plastic or a plastic composition). For example and without limitation, the primary carrier 150 may include a rigid polymer material that may not flex/bend/deform to a significant degree when expected loads applied to the primary carrier 150, such as a seated user. A primary carrier 150 may include a front side 150a and/or a rear side 150b, which may generally face in opposite directions (e.g., generally in an X-direction). A front side 150a may face generally toward a user sitting on the seat assembly 100. A rear side 150b may face generally away from a user sitting on the seat assembly 100 and/or toward a seatback frame 146. A variety of other components and/or parts may be connectable to a primary carrier 150, such as on a front side 150a and/or a rear side 150b of the primary carrier 150. As such, one or more seatback 110 portions and/or components may be connected to the primary carrier 150 to form a subassembly, which may then be connected to a seatback frame 146 via connecting the primary carrier 150 to the seatback frame 146, which may simplify and/or expedite assembly of a seatback 110 and/or a seat assembly 100. To facilitate such connections, a primary carrier 150 may include a plurality of connectors (e.g., flanges, recesses 324, bosses, and/or other connecting structure 180).

With embodiments, such as generally depicted in FIGS. 3A-8 and 9, a primary carrier 150 may include and/or be defined by a plurality of portions and/or sections. In some examples, a primary carrier 150 may include a main portion 152. A main portion 152 may, for example, be disposed at or about a region where the back of user would be located when sitting in the seat assembly 100. A main portion 152 may extend perpendicular to the X-direction and/or may connect other portions of the primary carrier 150 to one another.

With embodiments, such as generally depicted in FIGS. 3A, 3C, 4, 8, and 9, a primary carrier 150 may include a headrest portion 154. A headrest portion 154 may be disposed at, about, and/or above a main portion 152 generally in a Z-direction. The headrest portion 154 may be configured, for example, to connect to various seat components, such as a headrest 112 and/or components thereof.

With embodiments, such as generally depicted in FIGS. 3A-9, a primary carrier 150 may include one or more bolster portions, such as a first bolster portion 156 and a second bolster portion 158 (e.g., a left bolster portion and/or a right bolster portion). A first bolster portion 156 and a second bolster portion 158 may be connected to opposite lateral sides (e.g., opposite sides relative to the Y-direction) of the main portion 152. A first bolster portion 156 and/or a second bolster portion 158 may protrude from the main portion 152 (e.g., at an oblique angle), such as to guide a user to sit in a central region of the seatback 110 and/or to bias the user toward a designed seating position. A first bolster portion 156 may include and/or be defined by a first upper bolster portion 156a and/or a first lower bolster portion 156b. A first upper bolster portion 156a may be disposed above a first lower bolster portion 156b, such as generally in a Z-direction. A second bolster portion 158 may include and/or be defined by a second upper bolster portion 158a and/or a second lower bolster portion 158b. A second upper bolster portion 158a may be disposed above a second lower bolster portion 158b, such as generally in a Z-direction.

Figure 4:
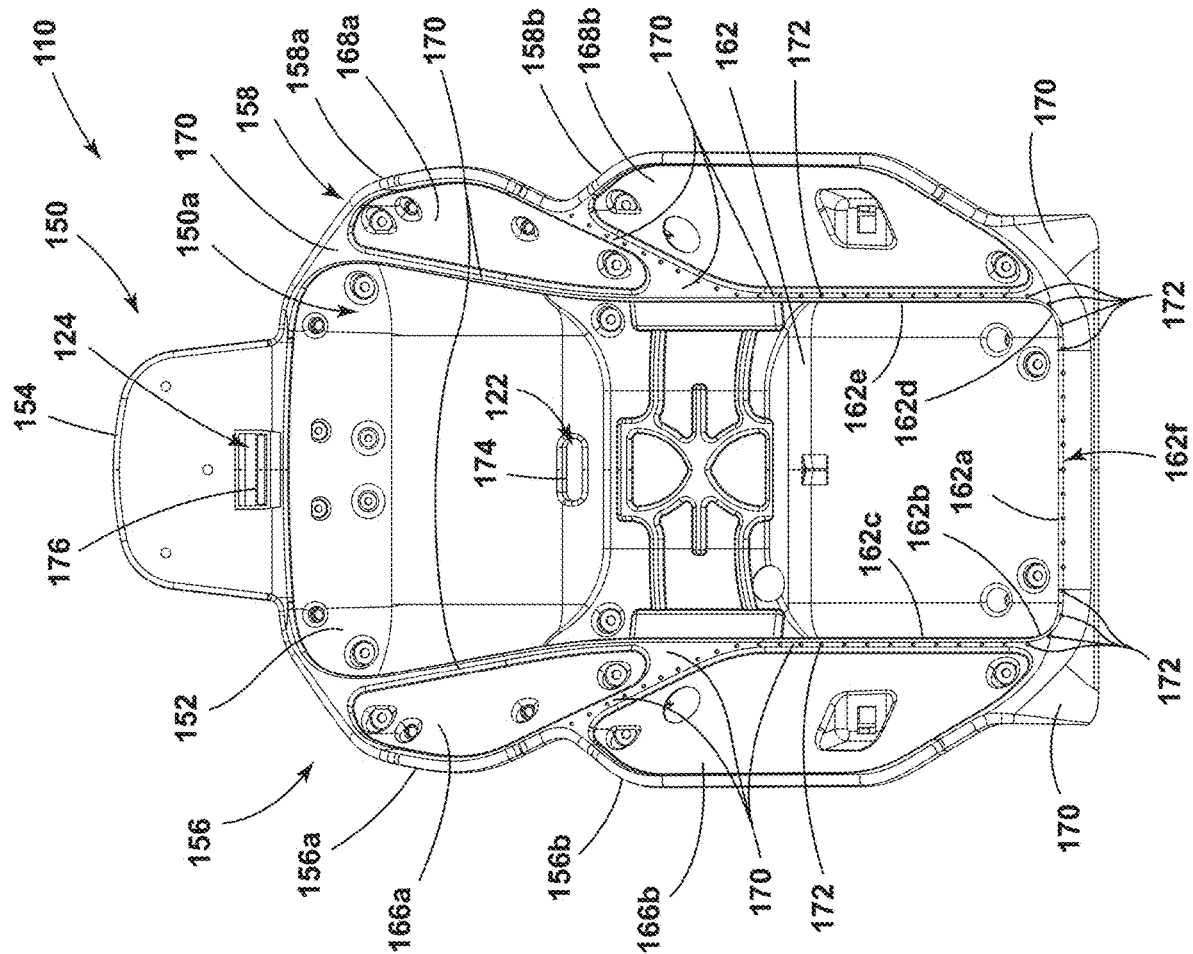
FIG. 4 is a front view of an embodiment of a primary carrier according to teachings of the present disclosure.

With embodiments, such as depicted in FIGS. 3A, 4, and 5, a primary carrier 150 may include one or more depressions 162, 166a, 166b, 168a, 168b configured to receive and/or retain another seat component to, for example, facilitate proper positioning and/or alignment of one or more seat components during assembly on the primary carrier 150. For example, a main portion 152 may include a main portion depression 162, which may be configured to receive at least a portion of a main cushion assembly 190. A first upper bolster portion 156a may include a first upper bolster depression 166a, which may be configured to receive at least a portion of a first upper bolster cushion assembly 192. A first lower bolster portion 156b may include a first lower bolster depression 166b, which may be configured to receive at least a portion of a first lower bolster cushion assembly 194. A second upper bolster portion 158a may include a second upper bolster depression 168a, which may be configured to receive at least a portion of a second upper bolster cushion assembly 196. A second lower bolster portion 158b may include a second lower bolster depression 168b, which may be configured to receive at least a portion of a second lower bolster cushion assembly 198. One or more (e.g., all) of the depression 162, 166a, 166b, 168a, 168b may be disposed on a front side 150a of a primary carrier 150. A portion of a primary carrier 150 that at least partially defines a depression 162, 166a, 166b, 168a, 168b may protrude and/or bulge from a rear side 150b of the primary carrier 150, which may form and/or appear as a dome-like structure when viewing the rear side 150b of the primary carrier 150 (see, e.g., FIG. 11). For the purposes of clarity, in FIGS. 3C, 3D, 9, and 11, which depict rear sides 150b of embodiments of a primary carrier 150, portions of the primary carrier 150 that define a depression 162, 166a, 166b, 168a, 168b (e.g., appearing as a bulge and/or dome) are identified/labeled as the corresponding depression 162, 166a, 166b, 168a, 168b.

With embodiments, such as depicted in FIGS. 3A, 3B, and 4-8, at least a portion of a primary carrier 150 and/or a surface thereof (e.g., an exposed portion 170) may be exposed and/or may not be covered by another component, element, and/or structure (e.g., a cushion assembly 190-198, trim cover, etc.) and, thus, may function/serve as an external surface of the seatback 110 that may be visible to a user (e.g., an A-surface of the seatback 110 and/or the seat assembly 100). For example, one or more portions of the primary carrier 150 (e.g., on a front side 150a) disposed between, extending around a perimeter of, and/or separating one or more depressions 162, 166a, 166b, 168a, 168b may define an exposed portion 170 and/or an external surface of the primary carrier 150.

With embodiments, such as depicted in FIGS. 3A-8 and 11, a primary carrier 150 may include one or more first airflow outlets 172. A first airflow outlet 172 may be in fluid communication with a first airflow duct 120, a first TED 260, and/or a first air mover 270. A first airflow outlet 172 may be configured to conduct a first airflow 130 and/or may be configured to provide (e.g., directly, without a distribution/diffusion mat) a first airflow 130 toward a user sitting in the seat assembly 100. A first airflow outlet 172 may extend through a primary carrier 150 (e.g., generally in an X-direction), such as from a rear side 150b to a front side 150a of the primary carrier 150. A first airflow outlet 172 may be disposed in an exposed portion 170 of the primary carrier 150 and extend to an external surface of the primary carrier 150 (e.g., may be visible on/in the primary carrier 150 even after assembly is complete). A first airflow outlet 172 may be disposed in a portion (e.g., an exposed portion 170) of the primary carrier 150 extending between and/or separating two or more adjacent depressions 162, 166a, 166b, 168a, 168b and/or duct walls 182, 184 from each other such that, for example, a first airflow outlet 172 is aligned (e.g., generally in an X-direction) with a gap defined between two or more adjacent cushion assemblies 190-198 and/or a first airflow duct 120 defined between two or more duct walls 182, 184.

With embodiments, such as generally illustrated in FIGS. 3A-8 and 11, a plurality of first airflow outlets 172 may be disposed in the primary carrier 150, such as around at least a portion of a perimeter of one or more depressions 162, 166a, 166b, 168a, 168b. Additionally and/or alternatively, a plurality of first airflow outlets 172 may be disposed one after another to define one or more rows/sets 172a, 172b of first airflow outlets 172. For example, as generally illustrated in FIG. 3B, a first row/set 172a of first airflow outlets 172 and/or a second row/set 172b of first airflow outlets 172 may be disposed adjacent to and extend parallel to at least portion of a perimeter of a main portion depression 162. A first row/set 172a of first airflow outlets 172 may be disposed adjacent to and extend parallel to at least a portion of a lower side 162a, a first corner region 162b, and/or a first lateral side 162c of a main portion depression 162. A second row/set 172b of first airflow outlets 172 may be disposed adjacent to and/or extend parallel to at least a portion of a lower side 162a, a second corner region 162d, and/or a second lateral side 162e of a main portion depression 162. The first row/set 172a and/or the second row/set 172b may, for example and without limitation, include an L-shaped configuration.

With embodiments, such as generally illustrated in FIGS. 3A and 3B, a first row 172a and a second row 172b of first airflow outlets 172 may be spaced apart from one another at or about a central region 162f of a lower side 162a of a main portion depression 162. When a user sits on the seat assembly 100, their waist (e.g., belt region) and/or lower back may press against a primary carrier 150 at or about a central region 162f of a lower side 162a of a main portion depression 162 and substantially block any first airflow outlets 172 in this region and/or the user may not feel the first airflow 130 in this area, which may reduce air pressure of the first airflow 130. Spacing a first row 172a and a second row 172b of first airflow outlets 172 from one another in the central region 162f of the lower side 162a (e.g., not including first airflow outlets 172 in this region) may reduce first airflow 130 pressure lost in this region, which may increase the overall air pressure and/or efficiency of the first airflow 130.

In embodiments, one or more of a plurality of first airflow outlets 172 may be disposed adjacent to and disposed parallel to at least a portion of a perimeter of a main portion depression 162 (e.g., along a lower side 162a, a first corner region 162b, a first lateral side 162c, a second corner region 162d, a second lateral side 162e of a main portion depression 162), in region between a first upper bolster depression 166a and a first lower bolster depression 166b, and in a region between a second upper bolster depression 168a and a second lower bolster depression 168b as generally illustrated in FIG. 4. For example and without limitation, a plurality of first airflow outlets 172 may be disposed in a generally U-shaped configuration that may include a tapered opening.

With embodiments, such as generally depicted in FIGS. 3A, 3C, 4-6, and 9, a primary carrier 150 may include a second airflow opening 174, which may be disposed in a main portion 152 of the primary carrier 150. A second airflow opening 174 may extend through a primary carrier 150 (e.g., generally in an X-direction), such as from a rear side 150b to a front side 150a of the primary carrier 150. A second airflow opening 174 may be in fluid communication with a second airflow duct 122, a second TED 262, and/or a second air mover 272. A second airflow opening 174 may be configured to conduct a second airflow 132 and/or facilitate passage of the second airflow 132 from a second TED 262 through a primary carrier 150 to an intermediate layer 210 disposed on the primary carrier 150 (e.g., on a front side 150a of the primary carrier 150).

With embodiments, such as generally depicted in FIGS. 3A, 3C, 4-6, and 9, a primary carrier 150 may include a third airflow opening 176, which may be disposed in a headrest portion 154 of the primary carrier 150. A third airflow opening 176 may extend through a primary carrier 150 (e.g., generally in an X-direction), such as from a rear side 150b to a front side 150a of the primary carrier 150. A third airflow opening 176 may be in fluid communication with a third airflow duct 124, a third TED 264, and/or a third air mover 274. A third airflow opening 176 may be configured to conduct a third airflow 134 and/or facilitate passage of the third airflow 134 through a primary carrier 150.

With embodiments, such as generally depicted in FIGS. 3C, 3D, 9, and 11, a primary carrier 150 may include one or more connecting structures 180, which may be configured to facilitate connection of one or more components (e.g., a seatback frame 146, a TED 260-264, a duct cover 280, 292, 294, an air mover 270-274, etc.) to the primary carrier 150. A connecting structure 180 may include one or more duct walls 182, 184, which may be configured to engage a first duct cover 280. For example and without limitation, a primary carrier 150 may include a first duct wall 182 and/or a second duct wall 184 that may be integrally formed with the primary carrier 150. A duct wall 182, 184 may be disposed on and/or project from a primary carrier 150 (e.g., generally in an X-direction), such as from a rear side 150b of the primary carrier 150. The duct walls 182, 184 may extend along a primary carrier 150 adjacent and/or parallel to one another such that at least a portion of a first airflow duct 120 is defined between the first duct wall 182 and the second duct wall 184. A first duct wall 182 and a second duct wall 184 may extend along a rear side 150b of the primary carrier 150 such that a first airflow duct 120 is disposed in alignment (e.g., generally in an X-direction) with at least a portion of the primary carrier 150 extending between and/or separating two or more adjacent depressions 162, 166a, 166b, 168a, 168b from each other, with a gap defined between two or more adjacent cushion assemblies 190-198, and/or with one or more first airflow outlets 172. For example and without limitation, a first duct wall 182 and a second duct wall 184 may be configured such that a first airflow duct 120 is disposed in alignment (e.g., generally in an X-direction) with at least a portion of the primary carrier 150 disposed adjacent to and/or extending parallel to at least a portion of a perimeter of a main portion depression 162, including at least a portion of a lower side 162a, a first corner region 162b, a second corner region 162d, a first lateral side 162c, and/or a second lateral side 162e of the main portion depression 162.

With embodiments, a duct wall 182, 184 may be configured to project into and/or engage a channel 282 of a first duct cover 280 such that, for example, a first airflow duct 120 is closed by the first duct cover 280. A first duct wall 182 and/or a second duct wall 184 may engage, contact, and/or abut a first side portion 286 and/or a second side portion 288 of a first duct cover 280 (e.g., within a channel 282 of the first duct cover 280), respectively, which may substantially close and/or seal a first airflow duct 120. In some configurations, one or more seals may be disposed on and/or engage a primary carrier 150 (e.g., one or more duct walls 182, 184) and/or a first duct cover 280, such as to provide fluid sealing between the primary carrier 150 and the first duct cover 280.

Additionally and/or alternatively, a primary carrier 150 and/or a connecting structure 180 may include one or more grooves, which may be configured to engage a first duct cover 280. For example and without limitation, a primary carrier 150 may include a first groove and/or a second groove, which may be configured to engage and/or receive at least a portion of a first duct cover 280 (e.g., a first side portion 286 and/or a second side portion 288). When a first duct cover 280 is engaged with one or more grooves, a first duct cover 280 may close a first airflow duct 120 such that, for example, the first airflow duct 120 is defined by the primary carrier 150 and/or the first duct cover 280. A first groove and a second groove may be disposed on a primary carrier 150 in a similar manner to a first duct wall 182 and a second duct wall 184, respectively. One or more seals may, additionally or alternatively, be disposed on and/or engage a primary carrier 150 (e.g., disposed in one or more grooves) and/or a first duct cover 280, such as to provide fluid sealing between the primary carrier 150 and the first duct cover 280.

With embodiments, such as generally depicted in FIGS. 1A-2 and 5-8, a seatback 110 may include one or more cushion assemblies 190-198, which may be releasably connectable to a primary carrier 150. For example, a seatback 110 may include a main cushion assembly 190, a first upper bolster cushion assembly 192, a first lower bolster cushion assembly 194, a second upper bolster cushion assembly 196, and/or a second lower bolster cushion assembly 198. A main cushion assembly 190 may be disposed at least partially within and/or releasably connected to a main portion depression 162 of a primary carrier 150. A first upper bolster cushion assembly 192 may be disposed at least partially within and/or releasably connected to a first upper bolster depression 166a of a primary carrier 150. A first lower bolster cushion assembly 194 may be disposed at least partially within and/or releasably connected to a first lower bolster depression 166b of a primary carrier 150. A second upper bolster cushion assembly 196 may be disposed at least partially within and/or releasably connected to a second upper bolster depression 168a of a primary carrier 150. A second lower bolster cushion assembly 198 may be disposed at least partially within and/or releasably connected to a second lower bolster depression 168b of a primary carrier 150.

Figure 6:
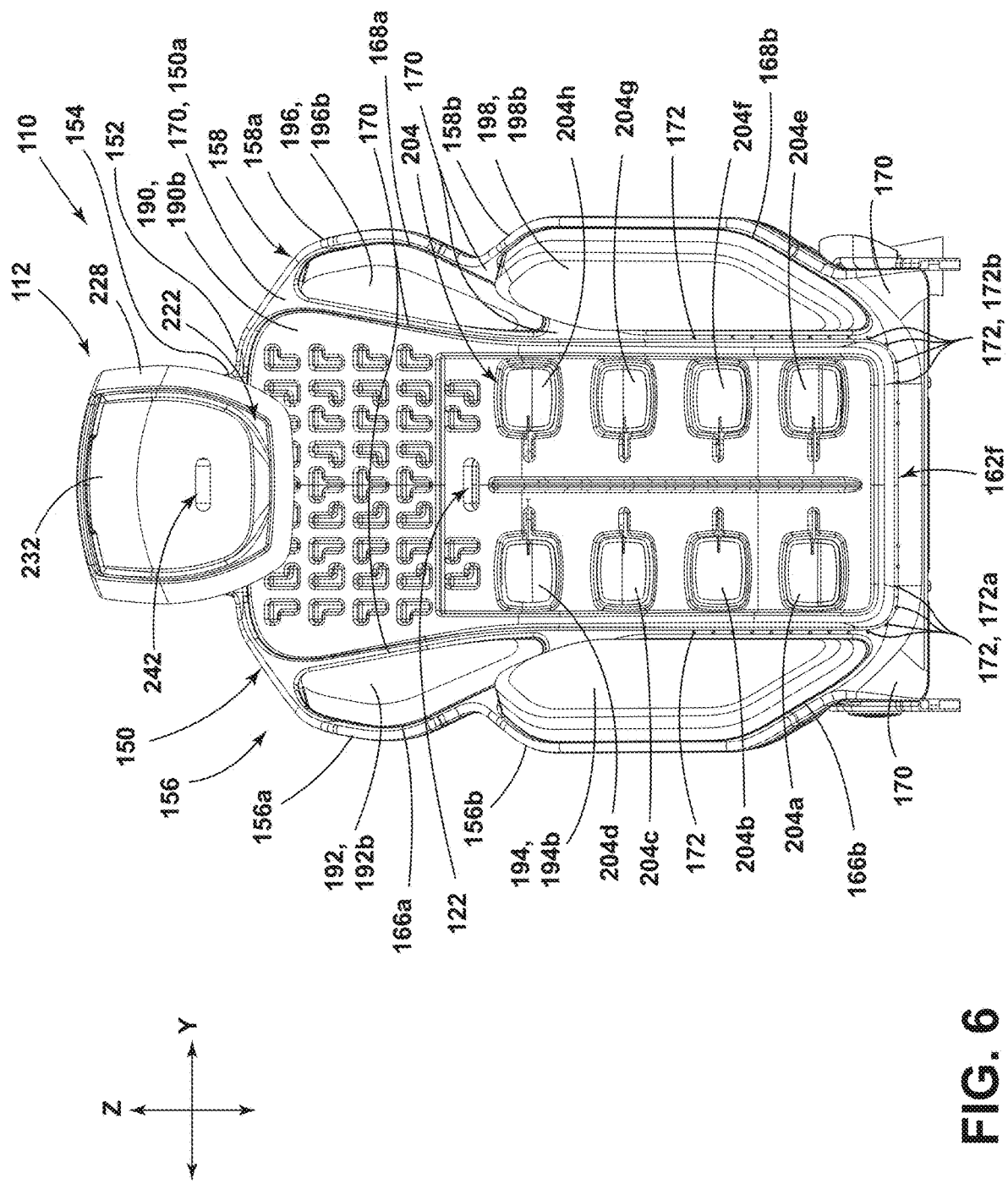

A seatback 110 and a headrest 112 with various portions hidden/removed are generally shown in FIGS. 5 and 6 to further illustrate an example arrangement of various components thereof. In FIG. 5, cushions 190b-198b, trim portions 190c-198c, a third bladder assembly 204, an intermediate layer 210, a first headrest support portion 228, a second headrest support portion 232, a headrest cushion 238, and a headrest trim cover 240 are hidden/removed to more clearly show the arrangement/positions of a primary carrier 150, one or more cushion supports 190a-198a, a first bladder assembly 200, a second bladder assembly 202, a headrest carrier 220, and a third TED 264. In FIG. 6, trim portions 190c-198c (e.g., perforated trim portions), an intermediate layer 210, a headrest cushion 238, and a headrest trim cover 240 are hidden/removed to more clearly show the arrangement/positions of a primary carrier 150, cushions 190b-198b, a third bladder assembly 204, a first headrest support portion 228, and a second headrest support portion 232.

With embodiments, such as generally depicted in FIGS. 2 and 5-8, a cushion assembly 190-198 may include a cushion support 190a-198a, a cushion 190b-198b, and/or a trim portion 190c-198c. A cushion support 190a-198a may be an elongated (e.g., rigid) body configured to support one or more cushions 190b-198b and trim portions 190c-198c (see, e.g., FIGS. 2 and 5). A cushion 190b-198b may be configured to cradle and/or comfort a user sitting on the seat assembly 100, and/or may be disposed on and/or connected to a cushion support 190a-198a (e.g., via adhesive) (see, e.g., FIGS. 2, 6, and 8). A trim portion 190c-198c may be disposed on and/or connected to a cushion 190b-198b and/or a cushion support 190a-198a (see, e.g., FIGS. 1A-2 and 7). A trim portion 190c-198c may be wrapped at least partially around and/or at least partially enclose a cushion 190b-198b and/or a cushion support 190a-198a. A cushion assembly 190-198 may be individually assembled/constructed and subsequently connected to a primary carrier 150, which may simplify and/or expedite assembly of a seatback 110.

With embodiments, such as generally depicted in FIGS. 2, 5, and 6, a seat assembly 100 may include one or more bladder assemblies 200-204, which may be configured to adjust a seat bottom 108 and/or a seatback 110 (e.g., an amount of support provided by a seat bottom 108 and/or seatback 110). A bladder assembly 200-204 may be integrated within a seat bottom 108, a seatback 110, and/or a component thereof. For example and without limitation, a seatback 110 may include a first bladder assembly 200, a second bladder assembly 202, and/or a third bladder assembly 204.

With embodiments, such as depicted in FIGS. 2 and 5, a first bladder assembly 200 may include one or more first bolster bladders 200a and/or one or more second bolster bladders 200b. A first bolster bladder 200a may be associated with and/or disposed at least partially in a first lower bolster cushion assembly 194 and/or a component thereof. A second bolster bladder 200b may be associated with and/or disposed at least partially in a second lower bolster cushion assembly 198 and/or a component thereof.

With embodiments, such as generally depicted in FIGS. 2 and 5, a second bladder assembly 202 may include one or more bladders 202a-202c. A second bladder assembly 202 may be associated with and/or disposed at least partially in a main cushion assembly 190 and/or a component thereof, such as to align with a lumbar region of a user sitting in the seat assembly 100.

With embodiments, such as generally depicted in FIGS. 2 and 6, a third bladder assembly 204 may include one or more bladders 204a-204h. A third bladder assembly 204 may be associated with and/or disposed at least partially in a main cushion assembly 190 and/or a component thereof. One or more bladders 204a-204h of a third bladder assembly 204 may be disposed in one or more columns, which may be disposed so as to align with opposing sides of the spine of a user sitting in the seat assembly 100. Additionally and/or alternatively, a first, second, and/or third bladder assembly 200-204 may be disposed on and/or connected (e.g., directly) to a primary carrier 150, such as within an associated one of the depressions 162, 166a, 166b, 168a, 168b.

With embodiments, such as generally illustrated in FIGS. 2, 5, and 6, a bladder assembly 200-204 may be connected, at least indirectly, with an ECU 106 (e.g., via a wired and/or wireless connection) such that the ECU 106 may be configured to control operation of the bladder assemblies 200-204. An ECU 106 may independently and/or concurrently control one or more bladders 200a, 200b, 202a-202c, 204a-204h of a bladder assembly 200-204. For example and without limitation, an ECU 106 may be configured to inflate and/or deflate one or more bladders 204a-204h of a third bladder assembly 204 according to a rhythm and/or a pattern to massage a user sitting in the seat assembly 100. An ECU 106 may be connected to and/or configured to control a fluid source 208 to inflate and/or deflate one or more bladders 200a, 200b, 202a-202c, 204a-204h of a bladder assembly 200-204 (see, e.g., FIGS. 10 and 12). A fluid source 208 may, for example and without limitation, include a fluid pump, a compressor, a fan, a fluid reservoir, and/or one or more control valves, among other components, that may be configured to selectively provide fluid (e.g., air) to and/or remove fluid from a bladder assembly 200-204. A fluid source 208 may be disposed on and/or connected to a primary carrier 150 (e.g., rear side 150b) and/or may be in fluid communication with one or more bladder assemblies 200-204 via one or more fluid conduits (e.g., tubes, hoses, ducts, etc.).

Figure 7:
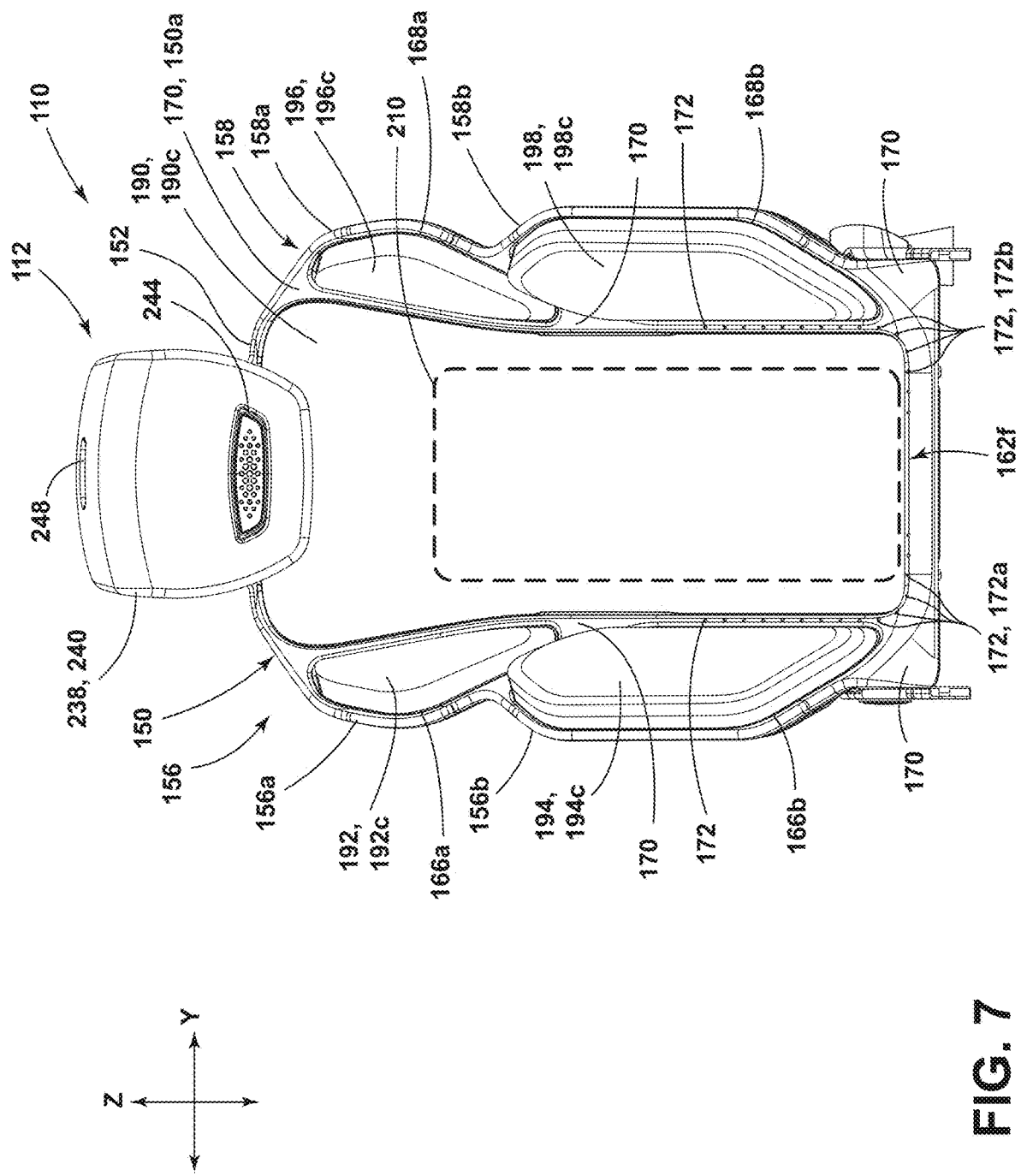

With embodiments, such as generally depicted in FIG. 7, a seat assembly 100 may include one or more intermediate layers 210. An intermediate layer 210 may include one or more heater elements (e.g., Peltier elements) configured to generate heat to heat a surface of a seat assembly 100, such as to heat a user sitting thereon. An intermediate layer 210 may be integrated within a seat bottom 108 and/or a seatback 110. For example and without limitation, an intermediate layer 210 may be associated with and/or disposed at least partially in a main cushion assembly 190 and/or a component thereof. An intermediate layer 210 may be configured to conduct a second airflow 132, to distribute the second airflow 132 across an area of the main cushion assembly 190, and/or to output the second airflow 132 from the main cushion assembly 190 and/or the seatback 110 (e.g., may be configured as and/or include a distribution mat). An intermediate layer 210 may be in fluid communication with a second airflow duct 122, a second airflow opening 174, a second TED 262, and/or a second air mover 272.

With embodiments, such as generally depicted in FIGS. 2, 6, and 10, a headrest 112 may be configured as a subassembly and/or may include one or more portions and/or components such as a headrest carrier 220, a first headrest support portion 228, a second headrest support portion 232, one or more headrest cushions 238, a headrest trim cover 240, a headrest airflow outlet 244, and/or a headrest exhaust outlet 248. A headrest 112 may include and/or define a headrest airflow duct 242 and/or a headrest exhaust duct 246. One or more portions and/or components (e.g., a first headrest support portion 228, a second headrest support portion 232, a third TED 264, one or more headrest cushions 238, a headrest trim cover 240, a headrest airflow outlet 244, and/or a headrest exhaust outlet 248) may be connected to a headrest carrier 220 to form a headrest 112 subassembly, which may then be connected to a primary carrier 150, such as via connecting the headrest carrier 220 to a headrest portion 154 of the primary carrier 150. A headrest carrier 220 may include and/or define a cavity 222, in which one or more headrest support portions 228, 232 and/or a third TED 264 may be at least partially disposed.

Figure 8:
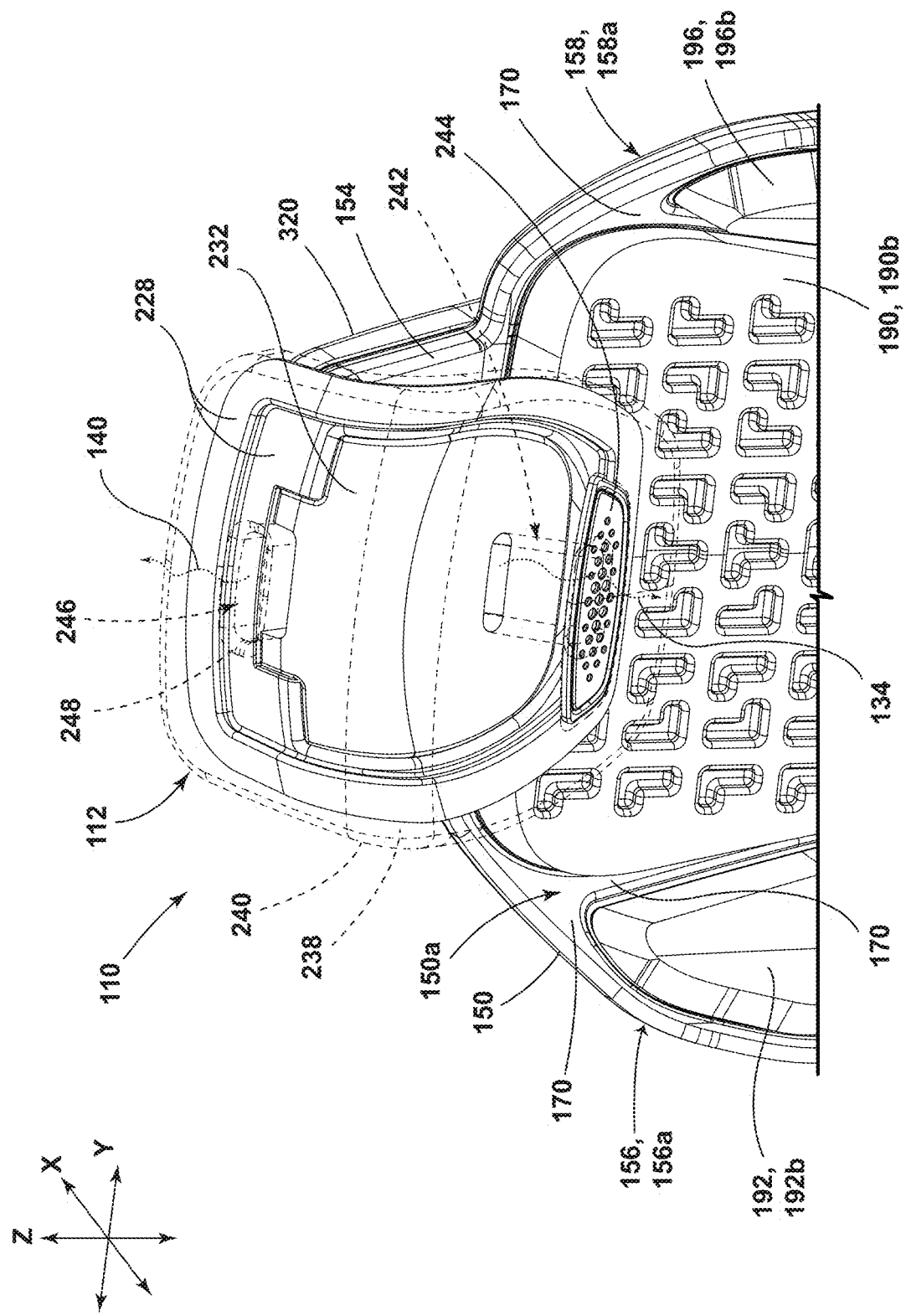
FIG. 8 is a perspective view generally illustrating portions of an embodiment of a headrest and an upper portion of a seatback according to teachings of the present disclosure.

With embodiments, such as generally depicted in FIGS. 2, 6, and 8, a headrest 112 may include a first headrest support portion 228. A first headrest support portion 228 may be disposed on and/or connected to a headrest carrier 220 and/or a third TED 264. A first headrest support portion 228 may be disposed at least partially in and/or protrude out of a cavity 222 of a headrest carrier 220. A first headrest support portion 228 may extend at least partially around (e.g., frame) a perimeter of a cavity 222 of a headrest carrier 220. In at least some embodiments, a first headrest support portion 228 may at least partially enclose a third TED 264 connected to a headrest carrier 220 (e.g., within a cavity 222), and/or a first headrest support portion 228 may at least partially define a headrest airflow duct 242 and/or a headrest exhaust duct 246.

With embodiments, such as generally depicted in FIGS. 2, 6, 8, and 9, a headrest 112 may include a second headrest support portion 232. A second headrest support portion 232 may be disposed on and/or connected to a headrest carrier 220, a first headrest support portion 228, and/or a third TED 264. A second headrest support portion 232 may be disposed at least partially within and/or substantially close a cavity 222 of a headrest carrier 220 (e.g., in conjunction with a first headrest support portion 228). A second headrest support portion 232 may be configured such that, when disposed on a first headrest support portion 228, a headrest exhaust duct 246 is defined by and/or between the first headrest support portion 228 and second headrest support portion 232. A second headrest support portion 232 may at least partially define a headrest airflow duct 242 and/or a headrest exhaust duct 246.

With embodiments, such as generally depicted in FIGS. 2, 7, 8, 10, 12, and 13, a headrest 112 may include one or more headrest cushions 238, a headrest trim cover 240, a headrest airflow outlet 244, and/or a headrest exhaust outlet 248. One or more headrest cushions 238 may be configured to cradle and/or comfort the head of a user sitting on the seat assembly 100. A headrest cushion 238 may be disposed on and/or connected to a headrest carrier 220 and/or one or more headrest support portions 228, 232 (e.g., via adhesive). A headrest trim cover 240 may be disposed on and/or connected to a headrest cushion 238, a headrest carrier 220, and/or one or more headrest support portions 228, 232. A headrest trim cover 240 may be wrapped at least partially around and/or at least partially enclose a headrest cushion 238. A headrest trim cover 240 may cover at least a portion of a headrest carrier 220 and/or one or more headrest support portions 228, 232. A headrest airflow outlet 244 and/or a headrest exhaust outlet 248 may be disposed on, connected to, and/or integrated at least partially within a headrest cushion 238 and/or a headrest trim cover 240. In some examples, a headrest airflow outlet 244 and/or a headrest exhaust outlet 248 may be covered by a headrest trim cover 240. A headrest airflow outlet 244 may face generally in an X-direction and/or may be configured to direct a third airflow 134 out of a headrest 112 toward a head and/or neck region of a user sitting in a seat assembly 100. A headrest exhaust outlet 248 may face generally in a Z-direction and/or may be configured to direct a third exhaust airflow 140 out of a headrest 112 and away from a user sitting in the seat assembly 100. A headrest exhaust outlet 248 may, however, face other directions, if desired.

With embodiments, such as generally depicted in FIGS. 8 and 9, a headrest airflow duct/passage 242 may be at least partially defined by and/or extend through a first headrest support portion 228, a second headrest support portion 232, one or more headrest cushions 238, and/or a headrest trim cover 240. A headrest airflow duct 242 may be in fluid communication with a third TED 264, a third air mover 274, and/or a headrest airflow outlet 244. A headrest airflow duct 242 may be configured to receive a third airflow 134 from a third air mover 274 and/or a third TED 264 and conduct the third airflow 134 through one or more portions of a headrest 112, such as to/toward a headrest airflow outlet 244.

With embodiments, such as generally depicted in FIGS. 8 and 9, a headrest exhaust duct 246 may be at least partially defined by and/or extend through a first headrest support portion 228, a second headrest support portion 232, a headrest carrier 220, one or more headrest cushions 238, and/or a headrest trim cover 240. A headrest exhaust duct 246 may be in fluid communication with a third TED 264, a third air mover 274, and/or a headrest exhaust outlet 248. A headrest exhaust duct 246 may be configured to receive a third exhaust airflow 140 from a third TED 264 and conduct the third exhaust airflow 140 through one or more portions of a headrest 112 to a headrest exhaust outlet 248, via which the third exhaust airflow 140 may be exhausted and/or discharged from a headrest 112 and/or a seat assembly 100.

With embodiments, such as generally depicted in FIGS. 2, 5, 9, 10, and 12, a seat assembly 100 may include one or more thermoelectric devices (TEDS) 260-264, which may be configured to heat and/or cool an airflow. A TED 260-264 may be configured to receive an airflow, to heat and/or cool the received airflow, to output a heated/cooled airflow, and/or exhaust an exhaust airflow (e.g., cooled airflow if outputting a heated airflow, heated airflow if outputting a cooled airflow). For example and without limitation, a seat assembly 100 may include a first TED 260, a second TED 262, and/or a third TED 264. One or more TEDs (e.g., a first TED 260 and/or a second TED 262) may be connected to a primary carrier 150, such as on a rear side 150b of a primary carrier 150. Additionally and/or alternatively, one or more TEDs (e.g., a third TED 264) may be disposed within and/or connected to a headrest 112. An ECU 106 may be configured to control one or more TEDs 260-264, such as separately/independently. For example and without limitation, the ECU 106 may be configured to control TEDs 260-264 to provide three different climate zones (e.g., a main zone, a bolster zone, and a headrest zone) for a user of the seat assembly 100.

With embodiments, such as generally depicted in FIGS. 2, 9, 10, and 12, a first TED 260 may be connected to a primary carrier 150 (e.g., on a rear side 150b), a first duct cover 280, an exhaust duct cover 294, and/or a first air mover 270. A first TED 260 may include an air inlet 260a, an airflow outlet 260b, and/or an exhaust outlet 260c. An air inlet 260a of a first TED 260 may be connected to and/or in fluid communication with a first air mover 270. An airflow outlet 260b of a first TED 260 may be connected to a primary carrier 150 and/or a first duct cover 280, and/or may be in fluid communication with a first airflow duct 120. An exhaust outlet 260c of a first TED 260 may be connected to a primary carrier 150 and/or an exhaust duct cover 294, and/or may be in fluid communication with an exhaust duct (e.g., a common exhaust duct 126). A first TED 260 may be configured to receive a first airflow 130 from a first air mover 270 through an air inlet 260a, heat and/or cool the first airflow 130, output the heated/cooled first airflow 130 into a first airflow duct 120 via an airflow outlet 260b, and/or exhaust a first exhaust airflow 136 into an exhaust duct (e.g., a common exhaust duct 126) via an exhaust outlet 260c.

With embodiments, such as generally depicted in FIGS. 2, 9, 10, and 12, a second TED 262 may be connected to a primary carrier 150 (e.g., on a rear side 150b), an exhaust duct cover 294, and/or a second air mover 272. A second TED 262 may include an air inlet 262a, an airflow outlet 262b, and/or an exhaust outlet 262c. An air inlet 262a of a second TED 262 may be connected to and/or in fluid communication with a second air mover 272. An airflow outlet 262b of a second TED 262 may be connected to a primary carrier 150 (e.g., at or about a second opening), and/or may be in fluid communication with a second airflow duct 122. An exhaust outlet 262c of a second TED 262 may be connected to a primary carrier 150 and/or an exhaust duct cover 294, and/or may be in fluid communication with an exhaust duct (e.g., a common exhaust duct 126). A second TED 262 may be configured to receive a second airflow 132 from a second air mover 272 through an air inlet 262a, heat and/or cool the second airflow 132, output the heated/cooled second airflow 132 into a second airflow duct 122 via an airflow outlet 262b, and/or output a second exhaust airflow 138 into an exhaust duct (e.g., a common exhaust duct 126) via an exhaust outlet 262c.

With embodiments, such as generally depicted in FIGS. 2 and 5, a third TED 264 may be disposed at least partially within a headrest 112 and/or connected to a portion thereof. For example, a third TED 264 may be disposed on and connected to a headrest carrier 220 within a cavity 222, and/or a first headrest support portion 228 may be disposed on the third TED 264 to at least partially enclose the third TED 264 between the headrest carrier 220 and the first headrest support portion 228. Additionally or alternatively, a third TED 264 may be disposed on and connected to a first headrest support portion 228 and/or a second headrest support portion 232 may be disposed on the third TED 264 to at least partially enclose the third TED 264 between the first headrest support portion 228 and the second headrest support portion 232. A third TED 264 may include an air inlet 264a, an airflow outlet 264b, and/or an exhaust outlet 264c. An air inlet 264a of a third TED 264 may be connected to a headrest carrier 220 and/or a first headrest support portion 228, and/or may be in fluid communication with a third airflow duct 124 and/or a third air mover 274. An airflow outlet 264b of a third TED 264 may be connected to one or more headrest support portions 228, 232 (e.g., at or about a headrest airflow duct 242), and/or may be in fluid communication with a headrest airflow duct 242 and/or a headrest airflow outlet 244. An exhaust outlet 264c of a third TED 264 may be connected to a headrest carrier 220 and/or one or more headrest support portions 228, 232 (e.g., at or about a headrest exhaust duct 246), and/or may be in fluid communication with a headrest exhaust duct 246 and/or a headrest exhaust outlet 248. A third TED 264 may be configured to receive a third airflow 134 from a third air mover 274 (e.g., via a third airflow duct 124) through an air inlet 264a, heat and/or cool the third airflow 134, output the heated/cooled third airflow 134 into a headrest airflow duct 242 via an airflow outlet 264b, and/or output a third exhaust airflow 140 into a headrest exhaust duct 246 via an exhaust outlet 264c.

With embodiments, such as generally depicted in FIGS. 2, 9, 10, and 12, a seat assembly 100 may include one or more air movers 270-274 (e.g., fans, blowers, conveyors, etc.), which may be configured to provide and/or generate one or more airflows. For example, a seat assembly 100 may include a first air mover 270, a second air mover 272, and/or a third air mover 274. An air mover 270-274 may be connected to a primary carrier 150, such as on a rear side 150b of a primary carrier 150. One or more air movers 270-274 may draw air into an interior space 326 of a seatback 110 and/or a seat assembly 100 (e.g., a seatback interior space 326) through one or more openings and/or gaps, such as an air intake opening 342.

With embodiments, such as generally depicted in FIGS. 2, 9, 10, and 12, a first air mover 270 may be connected to and/or in fluid communication with a first TED 260, a first airflow duct 120, and/or one or more first airflow outlets 172. A first air mover 270 may be configured to provide/drive a first airflow 130 (i) to/through a first TED 260 where the first airflow 130 may be heated and/or cooled, (ii) into/through a first airflow duct 120, (iii) out of the first airflow duct 120 via one or more first airflow outlets 172, and/or (iv) onto a user sitting on the seat assembly 100. A first air mover 270 may, additionally and/or alternatively, be configured to drive a first exhaust airflow 136 out of a first TED 260, through an exhaust duct (e.g., a common exhaust duct 126) to a seatback exhaust outlet 296, and/or out of a seatback 110 via the seatback exhaust outlet 296. A first air mover 270 may be disposed on and/or connected to a primary carrier 150 (e.g., on a rear side 150b), such as proximate and/or adjacent to one or more first airflow outlets 172. A first air mover 270 and a second air mover 272 may be disposed on and/or connected to opposite sides of an exhaust duct cover 294 (e.g., relative to a Z-direction). A first air mover 270 may be connected directly to a first TED 260 (e.g., to an air inlet 260a of a first TED 260) and/or indirectly to a first TED 260 (e.g., via a duct, pipe, etc.).

With embodiments, such as generally depicted in FIGS. 2, 9, 10, and 12, a second air mover 272 may be connected to and/or in fluid communication with a second TED 262, a second airflow duct 122, a second airflow opening 174, one or more intermediate layer 210, and/or one or more cushion assemblies 190-198 (e.g., a main cushion assembly 190). A second air mover 272 may be configured to provide/drive a second airflow 132 (i) to/through a second TED 262 where the second airflow 132 may be heated and/or cooled, (ii) into/through a second airflow duct 122, (iii) from the second airflow duct 122 through the second airflow opening 174 to a main cushion assembly 190 and/or an intermediate layer 210, (iv) through the intermediate layer 210 and/or the main cushion assembly 190, and/or (v) onto a user sitting on the seat assembly 100. A second air mover 272 may, additionally and/or alternatively, be configured to drive a second exhaust airflow 138 out of a second TED 262, through an exhaust duct (e.g., a common exhaust duct 126) to a seatback exhaust outlet 296, and/or out of a seatback 110 via the seatback exhaust outlet 296. A second air mover 272 may be disposed on and/or connected to a primary carrier 150 (e.g., on a rear side 150b), such as proximate and/or adjacent to a second airflow opening 174. A first air mover 270 and a second air mover 272 may be disposed on and/or connected to opposite sides of an exhaust duct cover 294 (e.g., relative to a Z-direction). A second air mover 272 may be connected directly to a second TED 262 (e.g., to an air inlet 262a of a second TED 262) and/or indirectly to a second TED 262 (e.g., via a duct, pipe, etc.).

With embodiments, such as generally depicted in FIGS. 2, 9, 10, and 12, a third air mover 274 may be connected to and/or in fluid communication with a third TED 264, a third airflow duct 124, a third airflow opening 176, and/or one or more headrest outlets 244, 248. A third air mover 274 may be configured to provide/drive a third airflow 134 (i) through a third airflow duct 124, (ii) from the third airflow duct 124 through the third airflow opening 176 to a third TED 264 where the third airflow 134 may be heated and/or cooled, (iii) through a headrest airflow duct 242, (iv) out of a headrest airflow outlet 244, and/or (v) onto a user sitting on the seat assembly 100. A third air mover 274 may, additionally and/or alternatively, be configured to drive a third exhaust airflow 140 out of a third TED 264, through a headrest exhaust duct 246 to a headrest exhaust outlet 248, and/or out of a headrest 112 via the headrest exhaust outlet 248. A third air mover 274 may be disposed on and/or connected to a primary carrier 150 (e.g., on a rear side 150b), such as proximate and/or adjacent to a headrest 112. A third air mover 274 may be connected indirectly to a third TED 264 (e.g., to an air inlet 264a of a third TED 264), such as via a third airflow duct 124.

With embodiments, such as generally depicted in FIGS. 2 and 9-12, a seatback 110 may include a first duct cover 280, which may be configured to at least partially define a first airflow duct 120. A first duct cover 280 may be disposed on and/or connected to a primary carrier 150 and/or a first TED 260. A first duct cover 280 may be configured to be disposed on a primary carrier 150 to close a first airflow duct 120 and may be configured to extend along at least a portion (e.g., an entirety) of the first airflow duct 120. The first duct cover 280 may have a corresponding and/or substantially similar (e.g., the same) shape as the first airflow duct 120 (e.g., as viewed in the X-direction). A first duct cover 280 may define a channel 282 that, when the first duct cover 280 is connected to a primary carrier 150, opens toward a primary carrier 150 (e.g., toward a rear side 150b of a primary carrier 150; generally in an X-direction). The first duct cover 280 may, for example and without limitation, include a generally rectangular configuration.

With embodiments, such as generally depicted in FIG. 11, a first duct cover 280 may have a base portion 284, a first side portion 286, and/or a second side portion 288. A first and second side portion 288 may be disposed on and/or connected to opposite sides of a base portion 284 and/or may extend away from the base portion 284 such that the first duct cover 280 has a generally C-shaped or U-shaped cross-section that opens toward the rear side 150b of the primary carrier 150. A first duct cover 280 may be configured to engage and/or receive at least a portion of first duct wall 182 and/or a second duct wall 184 of a primary carrier 150. When the first duct cover 280 is engaged with the duct walls 182, 184, (i) a first duct wall 182 may engage, contact, and/or abut against a first side portion 286 and/or a base portion 284 of the first duct cover 280, and/or (ii) a second duct wall 184 may engage, contact, and/or abut against a second side portion 288 and/or a base portion 284 of the first duct cover 280, which may substantially close and/or seal a first airflow duct 120. Additionally and/or alternatively, a first side portion 286 and/or a second portion of a first duct cover 280 may be configured to engage and/or be received by a first groove and/or a second groove of a primary carrier 150, respectively. In some embodiments, a first duct cover 280 may have any number of portions (e.g., a singular curved portion, a singular linear/flat portion) and/or shapes and does not necessarily need to define a channel 282, but may still substantially close a first airflow duct 120 when connected to a primary carrier 150.

With embodiments, such as generally depicted in FIGS. 2, 9, 10, and 12, a seatback 110 may include a second duct cover 292, which may be configured to at least partially define a third airflow duct 124. A second duct cover 292 may be disposed on and/or connected to a primary carrier 150 (e.g., at or about a third airflow opening 176) and/or a third air mover 274. A second duct cover 292 may be configured to conduct a third airflow 134 from a third air mover 274 to a third airflow opening 176 of a primary carrier 150. A second duct cover 292 may, for example and without limitation, include a generally C-shaped or U-shaped cross-section, at least in some regions.

With embodiments, such as generally depicted in FIGS. 2, 9, 10, and 12, a seatback 110 may include one or more exhaust duct covers 294, which may be configured to at least partially define one or more exhaust ducts 126 and/or portions thereof. An exhaust duct cover 294 may be disposed on and/or connected to a primary carrier 150, a TED 260, 262, and/or a seatback exhaust outlet 296. In some examples, an exhaust duct 126 may be configured as a common exhaust duct cover 294, which may be connected to two or more TEDs (e.g., a first TED 260 and a second TED 262) and/or at least partially define a common exhaust duct 126. A common exhaust duct cover 294 may be configured to merge a first exhaust airflow 136 from a first TED 260 and a second airflow 132 from a second TED 262 within a common exhaust duct 126 and/or direct the merged exhaust airflow 142 to an exhaust outlet 296, via which the merged exhaust airflow 142 may be exhausted and/or discharged from a seatback 110 and/or a seat assembly 100. For example and without limitation, an exhaust duct cover 294 may include a first branch portion 294a connected to a first TED 260 (e.g., an exhaust outlet 260c of the first TED 260), a second branch portion 294b connected to a second TED 262 (e.g., an exhaust outlet 262c of the second TED 262), and/or a merged portion 294c connected to a seatback exhaust outlet 296.

With embodiments, such as generally illustrated in FIGS. 1A-2, 10, 12, and 13, a seatback 110 may include a secondary back panel 310, which may be disposed on and/or connected to a primary carrier 150 (e.g., a rear side 150b of a primary carrier 150). A secondary back panel 310 may be configured to extend along and/or cover a rear side 150b of a first bolster portion 156 and/or a second bolster portion 158 of a primary carrier 150. At least a portion of a secondary back panel 310 and/or a surface thereof (e.g., a portion aligned with a first and/or second upper bolster portion 158a) may be exposed and/or may not be covered by another component, element, and/or structure (e.g., a primary back panel 320, a floating back panel 340, etc.) and, thus, may function/serve as an external surface of a seatback 110 that may be visible to a user (e.g., an A-surface of the seatback 110 and/or the seat assembly 100).

With embodiments, such as generally illustrated in FIGS. 1A-2, 12, and 13, a seatback 110 may include a primary back panel 320, which may be disposed on and/or connected to a primary carrier 150 (e.g., a rear side 150b of a primary carrier 150), a secondary back panel 310, and/or a seatback frame 146. A primary back panel 320 may be configured to at least partially receive and/or cover a seatback frame 146. At least a portion of a primary back panel 320 and/or a surface thereof may be exposed and/or may not be covered by another component, element, and/or structure (e.g., a floating back panel 340, etc.) and, thus, may function/serve as an external surface of a seatback 110 that may be visible to a user (e.g., an A-surface of the seatback 110 and/or the seat assembly 100). A primary back panel 320 may include a panel depression 322 configured to at least partially engage and/or receive a floating back panel 340. A panel depression 322 may open in a direction away from and/or opposite a primary carrier 150 (e.g., generally in an X-direction). One or more recesses 324 may be disposed in the panel depression 322 via which air may flow into and/or out of an interior space 326 of a seatback 110, which may be defined at least partially by a primary carrier 150, a primary back panel 320, a secondary back panel 310, and/or a floating back panel 340. A primary back panel 320 may include one or more lips 328 that extend around one or more recesses 324. One or more exhaust outlets 296 may be disposed on and/or connected to a primary back panel 320. A seatback exhaust outlet 296 may face generally in a Y-direction and/or may be configured to direct one or more exhaust airflows 136, 138, 142 out of a seatback 110 and away from a user sitting in the seat assembly 100. A seatback exhaust outlet 296 may, however, face other directions, as desired (e.g., a Z-direction).

With embodiments, such as generally illustrated in FIGS. 1A-2 and 13, a seatback 110 may include a floating back panel 340. A floating back panel 340 may be connected to a primary back panel 320, such as to one or more lips 328, and/or may be disposed at least partially within a panel depression 322 of a primary back panel 320. In some examples, a floating back panel 340 may be disposed completely within a panel depression 322 such that a surface of the floating back panel 340 and an outer surface of the primary back panel 320 are substantially flush. A floating back panel 340 may be disposed spaced apart from portions of the primary back panel 320 (e.g., panel depression 322 and/or lips 328) such that, for example, a gap 342 is defined therebetween. This gap 342 may be configured as an air intake opening via which air (e.g., ambient air) may flow into and/or out of an interior space 326 of a seatback 110. For example, during operation one or more air movers 270-274 may draw air through the air intake opening 342, through the recesses 324 of a primary back panel 320, into an interior space 326 of the seatback 110, and/or into the air movers 270-274. The gap/air intake opening 342 may, for example and without limitation, be about 2-3 mm.

In embodiments, a floating back panel 340 may cover a significant portion of a rear side 150b of the primary carrier 150 and/or the seatback 110. For example and without limitation, a surface area of the floating back panel 340 may be about 40% or more of a surface area of the rear of the seatback 110. A floating back panel 340 may extend from a bottom region of the seatback 110 to or toward a top of the seatback 110. For example and without limitation, a floating back panel 340 may be at least partially aligned with a main portion 152 and/or a headrest portion 154 of the primary carrier 150. A floating back panel 340 may include a tapered configuration, which may include being wider (e.g., in a Y-direction) at its bottom and tapering in toward its top. A floating back panel 340 may be disposed inward of one or more bolster portions 156, 158. The floating back panel 340 may serve as an external surface (e.g., an A-surface) and/or may cover some or all of the recesses 324 of the primary back panel 320. A height (e.g., in Z-direction) of the floating back panel 340 may, for example, be at least half of the height of the seatback 110, such as at least 60%, at least 70%, or other percentages of the height of the seatback 110. A shape of the floating back panel 340 may correspond to the shape of the seatback frame 146. For example and without limitation, the shape of the floating back panel 340 may be substantially the same as the seatback frame 146.

With embodiments, such as generally illustrated in FIG. 12, a seatback 110 may include one or more light sources 346, which may be configured to produced, provide, and/or emit light out from the seat assembly 100 through an air intake opening 342 (e.g., out of a gap between a primary back panel 320 and a floating back panel 340). For example, a light source 346 may be configured as and/or include one or more LED lights and/or light pipes. A light source 346 may be connected to a primary carrier 150, a primary back panel 320 (e.g., a lip 328), and/or a floating back panel 340. A light source 346 may be disposed within an interior space 326 of a seatback 110 at or about an air intake opening 342. In some examples, one or more light sources 346 may be disposed adjacent to and/or around some or all of a perimeter of a floating back panel 340.

In examples, an ECU (e.g., ECU 106) may include an electronic controller and/or include an electronic processor, such as a programmable microprocessor and/or microcontroller. In embodiments, an ECU may include, for example, an application specific integrated circuit (ASIC). An ECU may include a central processing unit (CPU), a memory (e.g., a non-transitory computer-readable storage medium), and/or an input/output (I/O) interface. An ECU may be configured to perform various functions, including those described in greater detail herein, with appropriate programming instructions and/or code embodied in software, hardware, and/or other medium. In embodiments, an ECU may include a plurality of controllers. In embodiments, an ECU may be connected to a display, such as a touchscreen display.

Various examples/embodiments are described herein for various apparatuses, systems, and/or methods. Numerous specific details are set forth to provide a thorough understanding of the overall structure, function, manufacture, and use of the examples/embodiments as described in the specification and illustrated in the accompanying drawings. It will be understood by those skilled in the art, however, that the examples/embodiments may be practiced without such specific details. In other instances, well-known operations, components, and elements have not been described in detail so as not to obscure the examples/embodiments described in the specification. Those of ordinary skill in the art will understand that the examples/embodiments described and illustrated herein are non-limiting examples, and thus it can be appreciated that the specific structural and functional details disclosed herein may be representative and do not necessarily limit the scope of the embodiments.

Reference throughout the specification to "examples, "in examples," "with examples," "various embodiments," "with embodiments," "in embodiments," or "an embodiment," or the like, means that a particular feature, structure, or characteristic described in connection with the example/embodiment is included in at least one embodiment. Thus, appearances of the phrases "examples, "in examples," "with examples," "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more examples/embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of examples/embodiments.

Joinder references (e.g., attached, coupled, connected, and the like) are to be construed broadly and may include intermediate members between a connection of elements, relative movement between elements, direct connections, indirect connections, fixed connections, movable connections, operative connections, indirect contact, and/or direct contact. As such, joinder references do not necessarily imply that two elements are directly connected/coupled and in fixed relation to each other. Connections of electrical components, if any, may include mechanical connections, electrical connections, wired connections, and/or wireless connections, among others. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

All matter contained in the above description or shown in the accompanying drawings shall be interpreted as illustrative only and not limiting. Changes in detail or structure may be made without departing from the present disclosure.

It should be understood that an electronic control unit (ECU), a system, and/or a processor as described herein may include a conventional processing apparatus known in the art, which may be capable of executing preprogrammed instructions stored in an associated memory, all performing in accordance with the functionality described herein. To the extent that the methods described herein are embodied in software, the resulting software can be stored in an associated memory and can also constitute means for performing such methods. Such a system or processor may further be of the type having ROM, RAM, RAM and ROM, and/or a combination of non-volatile and volatile memory so that any software may be stored and yet allow storage and processing of dynamically produced data and/or signals.

It should be further understood that an article of manufacture in accordance with this disclosure may include a non-transitory computer-readable storage medium having a computer program encoded thereon for implementing logic and other functionality described herein. The computer program may include code to perform one or more of the methods disclosed herein. Such embodiments may be configured to execute via one or more processors, such as multiple processors that are integrated into a single system or are distributed over and connected together through a communications network, and the communications network may be wired and/or wireless. Code for implementing one or more of the features described in connection with one or more embodiments may, when executed by a processor, cause a plurality of transistors to change from a first state to a second state. A specific pattern of change (e.g., which transistors change state and which transistors do not), may be dictated, at least partially, by the logic and/or code.

What is claimed is:

1. A seat assembly, comprising:
a seatback frame;
a primary carrier connected to the seatback frame;
an airflow duct defined at least partially by the primary carrier; and
a plurality of cushion assemblies connected to portions of the primary carrier;
wherein the primary carrier includes a plurality of airflow outlets extending through the primary carrier to an external surface and in fluid communication with the airflow duct; and
the plurality of airflow outlets are disposed in the primary carrier around at least a portion of a perimeter of at least one of the plurality of cushion assemblies.

2. The seat assembly according to claim 1, including a duct cover connected to the primary carrier, wherein the airflow duct is defined by the primary carrier and the duct cover.

3. The seat assembly according to claim 2, wherein:
the primary carrier includes a first duct wall and a second duct wall protruding therefrom; and
the duct cover is connected to the first duct wall and the second duct wall such that the airflow duct is defined by the primary carrier, the first duct wall, the second duct wall, and the duct cover.

4. The seat assembly according to claim 3, wherein at least some of the plurality of airflow outlets are disposed in a portion of the primary carrier extending from the first duct wall to the second duct wall.

5. The seat assembly according to claim 3, wherein:
the duct cover defines a channel opening toward the primary carrier; and
the first duct wall and the second duct wall project into the channel and abut against the duct cover to substantially close the airflow duct.

6. The seat assembly according to claim 1, wherein an exposed exterior surface of the primary carrier is partially covered by the plurality of cushion assemblies.

7. The seat assembly according to claim 1, wherein the plurality of airflow outlets are disposed in a portion of the primary carrier aligned with a gap defined between two adjacent cushion assemblies of the plurality of cushion assemblies.

8. The seat assembly according to claim 1, wherein:
the plurality of cushion assemblies includes a main cushion assembly, a first bolster cushion assembly, and a second bolster cushion assembly;
the first bolster cushion assembly and the second bolster cushion assembly are disposed on opposite sides of the main cushion assembly; and
the plurality of airflow outlets are disposed in (i) a first portion of the primary carrier aligned with a first gap defined between the main cushion assembly and the first bolster cushion assembly, and (ii) a second portion of the primary carrier aligned with a second gap defined between the main cushion assembly and the second bolster cushion assembly.

9. The seat assembly according to claim 1, including:
a first air mover connected to the primary carrier and configured to provide a first airflow to the airflow outlets; and
a first thermoelectric device (TED) connected to the primary carrier and configured to heat and/or cool the first airflow from the first air mover.

10. The seat assembly according to claim 9, including:
an intermediate layer connected to the primary carrier, the intermediate layer including a heater and/or configured to convey a second airflow;
a second air mover configured to provide the second airflow, the second air mover in fluid communication with the intermediate layer and connected to the primary carrier; and
a second TED configured to heat and/or cool the second airflow.

11. The seat assembly according to claim 10, including a common exhaust duct in fluid communication with the first TED and the second TED, and configured to conduct exhaust air of the first TED and/or the second TED out of the seat assembly.

12. The seat assembly according to claim 10, including:
a headrest connected to the primary carrier;

a third air mover connected to the primary carrier and configured to provide a third airflow to the headrest;

a third TED disposed within the headrest and configured to heat and/or cool the third airflow; and a headrest outlet disposed in the headrest and configured to convey the third airflow out of the headrest.

13. The seat assembly according to claim 12, wherein the headrest includes:

a headrest output duct connecting the third TED to the headrest outlet; and a headrest exhaust duct connected to the third TED, the headrest exhaust duct extending out of the headrest and configured to convey waste air of the third TED out of the headrest.

14. The seat assembly of claim 1, comprising:

a headrest connected to the primary carrier;

a duct cover connected to the primary carrier to substantially close the airflow duct;

a first air mover configured to provide a first airflow to the airflow outlets, the first air mover in fluid communication with the airflow duct and connected to the primary carrier;

a first thermoelectric device (TED) connected to the primary carrier and configured to heat and/or cool the first airflow;

an intermediate layer connected to the primary carrier, the intermediate layer including a heater and/or configured to convey a second airflow;

a second air mover configured to provide the second airflow, the second air mover in fluid communication with the intermediate layer and connected to the primary carrier;

a second TED connected to the primary carrier and configured to heat and/or cool the second airflow;

a third air mover connected to the primary carrier and configured to provide a third airflow to the headrest;

a third TED disposed within the headrest and configured to heat and/or cool the third airflow; and a headrest outlet disposed in the headrest and configured to convey the third airflow out of the headrest.

15. A seat assembly, comprising:

a seatback frame;

a primary carrier connected to the seatback frame; and an airflow duct defined at least partially by the primary carrier;

a plurality of cushion assemblies connected to portions of the primary carrier;

wherein the primary carrier includes a plurality of airflow outlets extending through the primary carrier to an external surface of the primary carrier and in fluid communication with the airflow duct;

the external surface of the primary carrier includes exposed portions that function as an external surface of the seat assembly and are not covered by the cushion assemblies or a trim cover; and the plurality of airflow outlets are aligned with one or more of the exposed portions.

16. The seat assembly according to claim 15, wherein the plurality of airflow outlets are disposed in the primary carrier around at least a portion of a perimeter of at least one of the plurality of cushion assemblies.

17. A seat assembly, comprising:

a seatback frame;

a primary carrier connected to the seatback frame;

an airflow duct defined at least partially by the primary carrier;

a primary back panel connected to the seatback frame; and a floating panel connected to the primary back panel;

wherein the primary carrier includes a plurality of airflow outlets extending through the primary carrier to an external surface of the primary carrier and in fluid communication with the airflow duct; and the floating panel is spaced apart from the primary back panel such that an air intake opening is defined between the primary back panel and the floating panel.

18. The seat assembly according to claim 17, including a plurality of cushion assemblies connected to portions of the primary carrier.

19. The seat assembly according to claim 17, wherein the floating panel is at least partially disposed in a panel depression of the primary back panel.

20. The seat assembly according to claim 17, including a light source disposed at or about the air intake opening and configured to provide light through the air intake opening.

* * * * *